United States Patent
Kanno

(10) Patent No.: US 10,270,168 B2
(45) Date of Patent: Apr. 23, 2019

(54) NON-CONTACT COMMUNICATION APPARATUS, ANTENNA CIRCUIT, ANTENNA DRIVE APPARATUS, NON-CONTACT FEEDING APPARATUS, ELECTRONIC DEVICE, TUNING METHOD, DISCOVERY METHOD, AND PROGRAMS FOR ACHIEVING THOSE METHODS

(71) Applicant: Dexerials Corporation, Tokyo (JP)

(72) Inventor: Masayoshi Kanno, Tokyo (JP)

(73) Assignee: Dexerials Corporation, Tokyo (JP)

(*) Notice: Subject to any disclaimer, the term of this patent is extended or adjusted under 35 U.S.C. 154(b) by 204 days.

(21) Appl. No.: 15/323,270

(22) PCT Filed: Jul. 9, 2015

(86) PCT No.: PCT/JP2015/069759
§ 371 (c)(1),
(2) Date: Dec. 30, 2016

(87) PCT Pub. No.: WO2016/009937
PCT Pub. Date: Jan. 21, 2016

(65) Prior Publication Data
US 2017/0155194 A1    Jun. 1, 2017

(30) Foreign Application Priority Data
Jul. 18, 2014  (JP) .................. 2014-148054

(51) Int. Cl.
*H01Q 7/00* (2006.01)
*H04B 1/04* (2006.01)
(Continued)

(52) U.S. Cl.
CPC .............. *H01Q 5/335* (2015.01); *G06K 7/10* (2013.01); *H01Q 7/00* (2013.01); *H04B 1/04* (2013.01);
(Continued)

(58) Field of Classification Search
CPC ............ G06K 7/10; H01Q 5/33; H01Q 5/335; H01Q 7/00; H01Q 7/005; H04B 1/04;
(Continued)

(56) References Cited

U.S. PATENT DOCUMENTS 4,278,980 A * 7/1981 Ogita .................. H01Q 1/24
343/748
5,564,101 A * 10/1996 Eisfeld .............. G07C 9/00182
340/12.5
(Continued)

FOREIGN PATENT DOCUMENTS

| JP | 2010079451 A | 4/2010 |
|----|--------------|--------|
| JP | 2012099968 A | 4/2012 |
| JP | 2013058170 A | 3/2013 |
| JP | 2013179556 A | 9/2013 |
| WO | WO-2013183472 A1 | 12/2013 |

OTHER PUBLICATIONS

International Search Report in International Application No. PCT/JP2015/069759, filed Jul. 9, 2015.

*Primary Examiner* — Tho G Phan
(74) *Attorney, Agent, or Firm* — Saliwanchik, Lloyd & Eisenschenk

(57) ABSTRACT

A non-contact communication apparatus 100 includes an antenna resonant unit 110 and an antenna drive unit 130. In the antenna drive unit 130, for example, a measurement unit consisting of an differential amplifier A3 measures an output current from an oscillation unit 131. A control unit 140 detects a minimum value or maximum value of the output current. The resonant frequency is controlled by the use of an optimal control value corresponding to the minimum value or maximum value. Therefore, even if the resonant frequency fluctuates due to variations in antenna characteristics in manufacture or a usage environment or aging, satisfactory communication characteristics at a set resonant frequency can be obtained.

17 Claims, 12 Drawing Sheets

(51) Int. Cl.
  *H04B 5/00* (2006.01)
  *H01Q 5/335* (2015.01)
  *G06K 7/10* (2006.01)
  *H04B 5/02* (2006.01)

(52) U.S. Cl.
  CPC ......... *H04B 1/0458* (2013.01); *H04B 5/0012* (2013.01); *H04B 5/0031* (2013.01); *H04B 5/0081* (2013.01); *H04B 5/02* (2013.01); *H01Q 7/005* (2013.01); *H04B 5/0087* (2013.01)

(58) Field of Classification Search
  CPC ...... H04B 1/0458; H04B 5/00; H04B 5/0012; H04B 5/0031; H04B 5/0037; H04B 5/0056; H04B 5/0081; H04B 5/0087; H04B 5/02
  See application file for complete search history.

(56) References Cited

U.S. PATENT DOCUMENTS

| | | | |
|---|---|---|---|
| 6,304,230 B1 * | 10/2001 | Panther | H01Q 1/3275 343/742 |
| 6,606,069 B2 * | 8/2003 | Kitamura | H01Q 9/30 343/715 |
| 8,816,920 B2 * | 8/2014 | Abe | H01Q 7/00 343/745 |
| 9,100,058 B2 * | 8/2015 | Kanno | H04B 5/0056 |
| 2007/0010217 A1 * | 1/2007 | Takahashi | H01Q 1/245 455/121 |
| 2009/0247079 A1 * | 10/2009 | Charles | G06K 7/0008 455/41.1 |
| 2013/0196610 A1 | 8/2013 | Sanji et al. | |
| 2013/0217327 A1 | 8/2013 | Kanno et al. | |
| 2014/0080409 A1 | 3/2014 | Frankland et al. | |
| 2014/0227986 A1 | 8/2014 | Kanno | |

* cited by examiner

NON-CONTACT COMMUNICATION APPARATUS, ANTENNA CIRCUIT, ANTENNA DRIVE APPARATUS, NON-CONTACT FEEDING APPARATUS, ELECTRONIC DEVICE, TUNING METHOD, DISCOVERY METHOD, AND PROGRAMS FOR ACHIEVING THOSE METHODS

CROSS-REFERENCE TO RELATED APPLICATION

This application is the U.S. national stage application of International Patent Application No. PCT/JP2015/069759, filed Jul. 9, 2015, which claims priority to Japanese Application No. 2014-148054, filed Jul. 18, 2014, the disclosures of each of which are incorporated herein by reference in their entirety.

TECHNICAL FIELD

The present invention relates to technologies such as a non-contact communication apparatus that performs non-contact communication by electromagnetic coupling and a non-contact feeding apparatus that performs non-contact feeding.

BACKGROUND ART

In recent years, non-contact communication systems each utilizing NFC (Near Field Communication) that is a short-distance non-contact communication technology have become significantly widespread. In such a non-contact communication system, a transmission signal output from a transmission antenna (resonant circuit) of a reader/writer (hereinafter, referred to as R/W) apparatus dedicated to the system is received by a reception antenna, which provided in a non-contact IC (Integrated circuit) card, using an electromagnetic induction action.

In such a non-contact communication system, for obtaining satisfactory communication characteristics, it is important that a frequency of a signal source in the R/W apparatus, a resonant frequency of the transmission antenna of the R/W apparatus, and a resonant frequency of the reception antenna (resonant circuit) in the non-contact IC card are equal. However, the resonant frequency of the reception antenna of the non-contact IC card or the transmission antenna of the R/W apparatus fluctuates due to various factors. It makes it difficult to stably transmit/receive information between the non-contact IC card and the R/W apparatus.

In view of this, in the technological field of the non-contact communication system, various technologies for maintaining a satisfactory communication state under any conditions have been proposed. Patent Literature 1 has disclosed a technology of achieving optimization of communication characteristics while monitoring a communication state as a transmission apparatus that performs non-contact communication with an outside by an electromagnetic induction action, as a configuration including a transmission antenna, a signal output unit, a monitor circuit unit, and a correction circuit unit.

In this transmission apparatus, the monitor circuit unit monitors information regarding a current flowing through an antenna coil and determines a communication state on the basis of the monitored information, and the correction circuit unit corrects the communication characteristics on the basis of a result of determination of the monitor circuit unit (e.g., see paragraph [0137] of Patent Literature 1).

CITATION LIST

Patent Literature

Patent Literature 1: Japanese Patent Application Laid-open No. 2013-58170

DISCLOSURE OF INVENTION

Technical Problem

As described above, the resonant frequency of the antenna fluctuates due to various factors. For example, it fluctuates due to variations in characteristics in manufacture, usage environment, aging, and the like of the antenna. It is desirable to provide a new countermeasure against fluctuations in resonant frequency due to those factors.

It is an object of the present invention to provide a technology such as a non-contact communication apparatus capable of coping with fluctuations in resonant frequency due to the above-mentioned factors and obtaining satisfactory communication characteristics.

Solution to Problem

In order to accomplish the above-mentioned object, a non-contact communication apparatus according to an embodiment of the present invention includes an antenna resonant unit, an oscillation unit, a measurement unit, and a control unit.

The antenna resonant unit includes an antenna coil, and a capacitor unit including a variable-capacitance capacitor.

The oscillation unit is capable of outputting a signal to the antenna resonant unit.

The measurement unit measures an output current from the oscillation unit to the antenna resonant unit.

The control unit is configured to detect a minimum value or maximum value of the measured output current and control a resonant frequency of the antenna resonant unit by the use of a control value of a control signal for controlling the capacitance of the variable-capacitance capacitor of the capacitor unit, the control value within an arbitrary range including an optimal control value such that the output current becomes minimum or maximum.

In this non-contact communication apparatus, the measurement unit measures the output current from the oscillation unit and the control unit detects the minimum value or maximum value of the output current and controls the resonant frequency by the use of the control value including the optimal control value corresponding to the minimum value or maximum value. Therefore, even if the resonant frequency fluctuates due to various factors, satisfactory communication characteristics at a set resonant frequency can be obtained.

The oscillation unit may output a signal having an oscillation frequency offset from a predetermined frequency.

The control unit may perform control by the use of a value of the control value within the arbitrary range, the value being offset from a control value such that the output current becomes minimum or maximum.

The oscillation unit and the measurement unit may be provided in an antenna drive unit connected to the antenna resonant unit.

With this, as in Patent Literature 1, it is unnecessary to provide a wire or resistor for monitoring the antenna current in the antenna resonant unit, between the antenna resonant unit and the antenna drive unit, and a simple circuit configuration can be provided. Further, with this, noise can be reduced and satisfactory communication characteristics can be obtained.

The non-contact communication apparatus may further include a storage unit that stores the optimal control value.

For example, even if the resonant frequency changes due to a usage environment or aging of this apparatus after manufacture of the non-contact communication apparatus (after shipment from a factory), the control unit can obtain the communication characteristics at an optimal resonant frequency by the use of a stored optimal control value.

The non-contact communication apparatus may further include a gain controller that controls a gain of a signal output from the oscillation unit. The control unit may be configured to set the gain that is one of antenna parameters to a first value in a communication period and set the gain to a second value different from the first value in a detection period of the minimum value or maximum value of the output current.

In this case, the second value may be larger than the first value. With this, the SN ratio of the signal can be increased in the detection period, and hence the control unit can obtain an accurate optimal control value.

The capacitor unit may include at least one of a series resonant capacitor unit and a parallel resonant capacitor unit or may include both of the series resonant capacitor unit and the parallel resonant capacitor unit.

The parallel resonant capacitor unit may include the variable-capacitance capacitor, and the series resonant capacitor unit may include a fixed-capacitance capacitor. Alternatively, the parallel resonant capacitor unit may include a fixed-capacitance capacitor, and the series resonant capacitor unit may include the variable-capacitance capacitor. Alternatively, the parallel resonant capacitor unit and the series resonant capacitor unit may each include the variable-capacitance capacitor.

An antenna circuit according to an embodiment of the present invention is an antenna circuit of a non-contact communication apparatus including an oscillation unit, a measurement unit, and a control unit, and includes an antenna resonant unit, an input line, and a control signal line.

The input line is configured to receive input of a signal having an oscillation frequency set by the oscillation unit.

The control signal line is configured to be connected to the variable-capacitance capacitor. A control value within an arbitrary range including an optimal control value of a control signal for controlling a capacitance of the variable-capacitance capacitor is input into the control signal line, the control signal being output from the control unit. The optimal control value is a value corresponding to a minimum value or maximum value of an output current from the oscillation unit to the antenna circuit, the output current being measured by the measurement unit.

An antenna drive apparatus according to an embodiment of the present invention is configured to drive the antenna resonant unit and includes an oscillation unit, a measurement unit, and a control value input unit into which a control value including an optimal control value is input.

The non-contact communication apparatus is also applicable to a non-contact feeding apparatus.

A tuning method according to an embodiment of the present invention is a tuning method for a resonant frequency of an antenna resonant unit, and includes setting, in an oscillation unit, a predetermined oscillation frequency of a signal output to the antenna resonant unit.

An output current from the oscillation unit to the antenna resonant unit is measured.

A minimum value or maximum value of the measured output current is detected.

A control value of a control signal for controlling the capacitance of the variable-capacitance capacitor of the capacitor unit is stored in a storage unit, the control value being within an arbitrary range including an optimal control value such that the output current becomes minimum or maximum.

A discovery method according to an embodiment of the present invention is a discovery method for a non-contact communication apparatus including an antenna resonant unit, and includes detecting the presence of an opposite device on an R/W (reader/writer) mode.

The presence of the opposite device is detected on a card mode when the presence of the opposite device is not detected.

When the presence of the opposite device on the card mode is not detected, an optimal control value of a control signal for controlling a capacitance of the variable-capacitance capacitor is detected, and tuning processing of a resonant frequency of the antenna resonant unit is executed.

Execution of the tuning processing may include storing, in the storage unit, the control value within the arbitrary range including the optimal control value. The optimal control value may be a control value such that a phase of an antenna current that is a current flowing through the antenna coil becomes 0, a control value such that the antenna current becomes minimum or maximum, a control value such that a phase of impedance becomes 0, a control value such that a phase of an output current from the oscillation unit to the antenna resonant unit becomes 0, or a control value such that the output current becomes minimum or maximum.

Execution of the tuning processing may include setting, in the oscillation unit, an oscillation frequency of a signal output to the antenna resonant unit. Further, execution of the tuning processing may include measuring an output current from the oscillation unit to the antenna resonant unit, detecting a minimum value or maximum value of the measured output current, and storing, in the storage unit, a control value of the control signal, the control value being within an arbitrary range including the optimal control value such that the output current becomes minimum or maximum.

When the presence of the opposite device on the card mode is not detected, next processing may be performed. That is, detection on the R/W mode and detection on the card mode may be sequentially repeated, and when a time-out regarding a processing time in which the detection on the R/W mode and the detection on the card mode are repeated occurs, the tuning may be executed.

A program according to an embodiment of the present invention is a program causing the above-mentioned non-contact communication apparatus or non-contact feeding apparatus to execute the above-mentioned tuning method. Alternatively, a program according to an embodiment of the present invention is a program causing the non-contact communication apparatus to execute the above-mentioned discovery method.

Advantageous Effects of Invention

As described above, in accordance with the present invention, it is possible to cope with fluctuations in resonant frequency due to various factors and obtain satisfactory communication characteristics.

MODE(S) FOR CARRYING OUT THE INVENTION

Hereinafter, embodiments of the present invention will be described with reference to the drawings.

First Embodiment

Non-Contact Communication System

Figure 1:
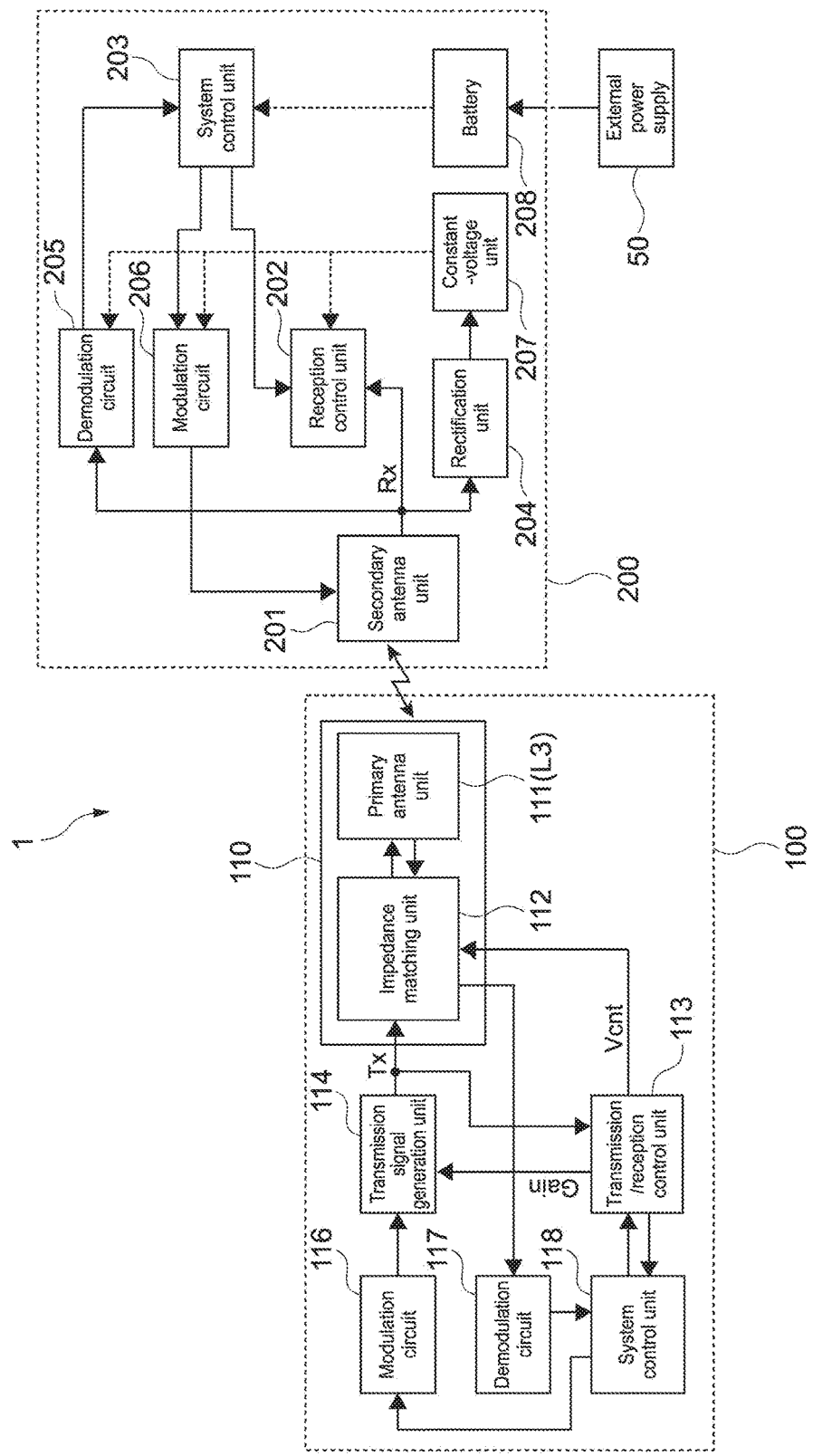
FIG. 1 is a block diagram showing a configuration of a non-contact communication system according to an embodiment of the present invention.

FIG. 1 is a block diagram showing a configuration of a non-contact communication system according to an embodiment of the present invention. Note that, in FIG. 1, wires related to input/output of information between circuit blocks are indicated by the solid-line arrow marks and wires related to feeding are indicated by the broken-line arrow marks.

A non-contact communication system 1 according to an embodiment of the present invention is applied to NFC (Near Field Communication) that is a near-field wireless communication technology including NFC-A, NFC-B, NFC-F, and the like based on International standards ISO/IEC18092, a WPC (Wireless Power Consortium) that is a non-contact feeding technology, or the like. That is, it is applied to a communication/feeding system that performs communication and feeding in a non-contact manner by electromagnetic induction between coils of primary and secondary antenna units.

The non-contact communication system 1 includes a transmission apparatus 100 and a reception apparatus 200. The transmission apparatus 100 functions as a non-contact communication apparatus. The non-contact communication system 1 transmits/receives information by non-contact communication between the transmission apparatus 100 and the reception apparatus 200. Note that examples of the non-contact communication system 1 can include a communication system in which a non-contact IC card standard and an NFC standard are combined, as represented by FeliCa (registered trademark).

(Transmission Apparatus (Non-Contact Communication Apparatus))

The transmission apparatus 100 will be described. The transmission apparatus 100 is an apparatus having a function of a reader/writer (R/W) that reads and writes data from/in the reception apparatus 200 in a non-contact manner. The transmission apparatus 100 includes, as shown in FIG. 1, an antenna resonant unit (antenna circuit) 110, a system control unit 118, a modulation circuit 116, and a demodulation circuit 117.

The antenna resonant unit 110 includes a primary antenna unit 111 and an impedance matching unit 112. As will be described later, the antenna resonant unit 110 configures a resonant circuit including an antenna coil and a resonant capacitor (capacitor unit including variable-capacitance capacitor). The antenna resonant unit 110 transmits/receives a signal to/from a secondary antenna unit 201 of the reception apparatus 200 by electromagnetic coupling.

A transmission/reception control unit 113 includes a voltage generation circuit (mostly, DAC 133 to be described later) that controls the capacitance of the resonant capacitor and a measurement device (mostly, differential amplifier A3 and ADC 134 to be described later) that measures an output current of an antenna drive unit (antenna drive apparatus) 130. The primary antenna unit 111 has a function of sending a transmission signal having a desired frequency through the resonant circuit and receiving a response signal from the reception apparatus 200 to be described later.

The impedance matching unit 112 has a function as a matching circuit that matches impedance between a transmission signal generation unit 114 and the primary antenna unit 111. Note that, although not shown in FIG. 1, the impedance matching unit 112 includes a variable-capacitance capacitor (hereinafter, referred to as variable capacitor). In this embodiment, the capacitance of the variable capacitor is controlled by the voltage generation circuit as described later, to thereby achieve impedance matching between the transmission signal generation unit 114 and the primary antenna unit 111 and optimization of the resonant frequency.

One of a small ceramic type is typically used as the variable capacitor. BaSrTiO$_3$ or the like is used as a ferroelectric material therefor. The capacitance is changed by changing relative permittivity of such a material. One of a type utilizing an RF switch or an MEMS (Micro Electro Mechanical Systems) type may be used as the variable capacitor.

The transmission signal generation unit 114 has a function of modulating a carrier signal having a desired frequency (e.g., 13.56 MHz) with transmission data input from the modulation circuit 116 and outputting the modulated carrier signal to the primary antenna unit 111 via the impedance matching unit 112.

The modulation circuit 116 has a function of encoding transmission data input from the system control unit 118 and outputting the encoded transmission data to the transmission signal generation unit 114.

The demodulation circuit 117 has a function of acquiring a response signal, which is received by the primary antenna unit 111, via the impedance matching unit 112, demodulating the response signal, and then outputting the demodulated response data to the system control unit 118.

The system control unit 118 has a function of generating a control signal for various types of control according to a command from the outside or a built-in program and outputting the control signal to the modulation circuit 116 and the transmission/reception control unit 113 to control operations of both of the circuit units. Further, the system control unit 118 has a function of generating transmission data corresponding to the control signal (command signal) and supplying the transmission data to the modulation circuit 116. In addition, the system control unit 118 has a function of performing predetermined processing on the basis of the response data demodulated by the demodulation circuit 117.

Note that, although, in the example shown in FIG. 1, the example in which the transmission/reception control unit 113 and the system control unit 118 are separately provided in the transmission apparatus 100 has been described, the non-contact communication system 1 according to the embodiment of the present invention is not limited to this example. For example, another circuit configuration may be employed such that the system control unit 118 includes the transmission/reception control unit 113.

Reception Apparatus

Next, the reception apparatus 200 will be described. Note that, in the example shown in FIG. 1, an example in which the reception apparatus 200 is constituted of a non-contact IC card (data carrier) is shown. Further, in this example, the example in which the reception apparatus 200 has a function of controlling its own resonant frequency will be described.

As shown in FIG. 1, the reception apparatus 200 includes the secondary antenna unit 201 having a function as the reception antenna, a rectification unit 204, a reception control unit 202, a demodulation circuit 205, a system control unit 203, a modulation circuit 206, a constant-voltage unit 207, and a battery 208.

The secondary antenna unit 201 includes a resonant circuit consisting of a resonant coil (not shown) and a plurality of resonant capacitors, for example. This resonant capacitor is configured to include a variable capacitor that changes in capacitance due to application of a control voltage. The secondary antenna unit 201 has a function of communicating with the primary antenna unit 111 of the transmission apparatus 100 by electromagnetic coupling and receiving a transmission signal from the transmission apparatus 100 due to a magnetic field generated by the primary antenna unit 111. At this time, the capacitance of the variable capacitor is controlled such that the resonant frequency of the secondary antenna unit 201 becomes a desired frequency.

The rectification unit 204 is constituted of a half-wave rectification circuit consisting of a diode for rectification and a capacitor for rectification, for example. The rectification unit 204 has a function of rectifying AC power, which is received by the secondary antenna unit 201, into DC power and outputting the rectified DC power to the constant-voltage unit 207.

The constant-voltage unit 207 has a function of subjecting an electrical signal (DC power), which is input from the rectification unit 204, to suppression processing and stabilization processing of voltage fluctuations (data component) and feeding the processed DC power to the reception control unit 202. Note that the DC power output via the rectification unit 204 and the constant-voltage unit 207 is used as a power supply for operating an IC in the reception apparatus 200.

The reception control unit 202 has a function of controlling resonant characteristics of the secondary antenna unit 201 and achieving optimization of the resonant frequency during reception. Specifically, by applying a control voltage on the variable capacitor of the secondary antenna unit 201, the capacitance is controlled, and the resonant frequency of the secondary antenna unit 201 is accordingly controlled.

The demodulation circuit 205 has a function of demodulating a reception signal received by the secondary antenna unit 201 and outputting the demodulated signal to the system control unit 203.

On the basis of the signal demodulated by the demodulation circuit 205, the system control unit 203 has a function of making a determination as to the contents thereof, performing necessary processing, and controlling the modulation circuit 206 and the reception control unit 202.

The modulation circuit 206 has a function of modulating a reception carrier according to a result (contents of demodulation signal) determined by the system control unit 203 and generating a response signal. Further, the modulation circuit 206 has a function of outputting the generated response signal to the secondary antenna unit 201. The response signal output from the modulation circuit 206 is sent from the secondary antenna unit 201 to the primary antenna unit 111 by non-contact communication.

The battery 208 has a function of feeding power to the system control unit 203. This power charge to the battery 208 is performed by connecting a power charge terminal therefor to an external power supply 50. When the reception apparatus 200 is configured to include the built-in battery 208 as in the example shown in FIG. 1, it is possible to more stably feed power to the system control unit 203, and stable operations become possible.

Note that the reception apparatus 200 may be configured to drive the system control unit 203 using DC power generated via the rectification unit 204 and the constant-voltage unit 207 without using the battery 208.

In the non-contact communication system 1 of this embodiment, data communication is performed in a non-contact manner via electromagnetic coupling between the primary antenna unit 111 of the transmission apparatus 100 and the secondary antenna unit 201 of the reception apparatus 200. Therefore, for performing highly efficient communication between the transmission apparatus 100 and the reception apparatus 200, the resonant circuits of the primary antenna unit 111 and the secondary antenna unit 201 are configured to resonate at the same carrier frequency (e.g., 13.56 MHz).

(Circuit Configuration of Non-Contact Communication Apparatus)

Figure 2:
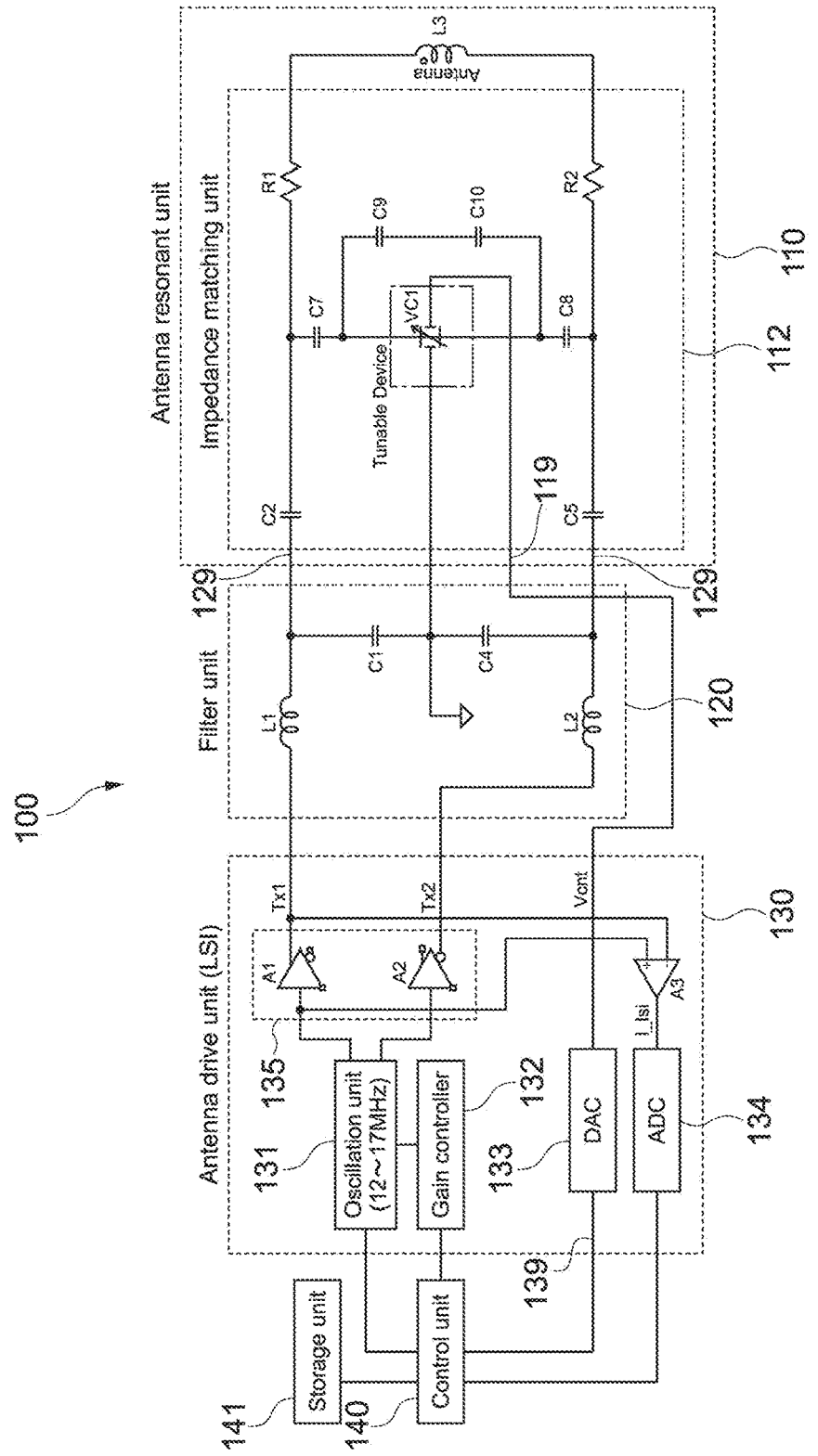
FIG. 2 shows a circuit configuration of a non-contact communication apparatus according to a first embodiment of the present invention.

FIG. 2 shows a circuit configuration of a non-contact communication apparatus that is the transmission apparatus 100. The non-contact communication apparatus includes the antenna resonant unit 110, a filter unit 120, an antenna drive unit 130, a control unit 140, and a storage unit 141.

The antenna resonant unit 110 includes an antenna coil L3 and the impedance matching unit 112. The antenna resonant unit 110 is configured by the impedance matching unit 112 being connected to the antenna coil L3. The impedance matching unit 112 prevents impedance mismatching between the antenna drive unit 130 and the antenna coil L3 and keeps the load of the antenna drive unit 130 constant and pure resistive irrespective of the antenna coil L3.

Specifically, the antenna resonant unit 110 is configured as a series-parallel resonant circuit in which, for example, a variable capacitor (parallel resonant capacitor unit) VC1 is connected in parallel and further, capacitors C2, C5 (series resonant capacitor unit) each having a fixed capacitance are connected in series. The variable capacitor VC1 changes in capacitance when a control voltage (control signal) input therein changes. With this, the resonant frequency of the antenna resonant unit 110 changes. Note that a plurality of variable capacitors may be provided and capacitances of the variable capacitors may be configured to change according to the same control voltage value.

Capacitors C7, C8 each have a function of DC cutting for preventing the above-mentioned control voltage (DC voltage) applied on the variable capacitor VC1 from being leaked to the antenna coil L3. Capacitors C9, C10 are additional capacitors for cancelling an antenna characteristic difference due to differences in antenna size and the like.

Further, the impedance matching unit 112 includes damping resistors R1, R2. The damping resistors R1, R2 determine a Q-factor (Quality Factor, sharpness) of the antenna resonant unit 110.

The filter unit 120 includes the coils L1, L2 and capacitors C1, C4 and has a function of EMC (Electro Magnetic Compatibility). An oscillation signal (above-mentioned transmission signal) having a high frequency, which is output from the antenna drive unit 130, is a square wave. The filter unit 120 has a function of removing high-frequency noise due to this oscillation signal. The coils L1, L2 are respectively connected to one terminals of the capacitors C2, C5. The capacitors C1, C4 are connected between the respective coils L1, L2 and the ground.

The antenna drive unit 130 includes an oscillation unit 131 capable of controlling an oscillation frequency, an output unit 135 that supplies an oscillation signal, which is obtained by the oscillation unit 131, to the antenna resonant unit 110, and a gain controller 132 that controls an output gain of the oscillation unit 131. Further, the antenna drive unit 130 includes the DAC (digital/analog converter) 133, a measurement unit, and the ADC (analog/digital converter) 134. The DAC 133 converts a digital control voltage value from the control unit 140, which will be described later, into an analog signal. The measurement unit consists of the differential amplifier A3 and measures an output current from the output unit 135. An output signal of this differential amplifier is input into the ADC 134 and converts it into a digital signal. The antenna drive unit 130 is constituted of, for example, LSI (Large Scale Integration).

Further, the non-contact communication apparatus includes the control unit 140 and the storage unit 141. The control unit 140 controls an oscillation frequency of the oscillation unit 131 and an antenna resonant frequency of the antenna resonant unit 110. The storage unit 141 stores setting values of antenna parameters, an oscillation frequency of the oscillation unit 131, and the like. The control unit 140 is equivalent to the transmission/reception control unit 113 or the system control unit 118 in FIG. 1 or an element in which both integrally function.

The oscillation unit 131 consists of a frequency-variable oscillator whose oscillation frequency is controllable over a wide range of, for example, 12 to 17 MHz according to a frequency control signal supplied from the control unit 140. In particular, the oscillation unit 131 is configured to be capable of outputting, as will be described later, a signal having an oscillation frequency set to be offset from a predetermined frequency, to the antenna resonant unit 110.

In this embodiment, the term "predetermined frequency" is a design value that depends on design of inductance of the antenna resonant unit 110, a Q-factor, impedance, and the like as will be described later and is a frequency at which an impedance phase becomes 0. Those are design values that determine antenna characteristics. The frequency at which the impedance phase becomes 0 may be equal to 13.56 MHz that is a standard value or may be deviated from it.

Further, in this embodiment, a target frequency that is a final oscillation frequency obtained by being offset from the predetermined frequency may be 13.56 MHz that is the standard value or may be set by some manufacturers to a value close to but different from the standard value. As described later again, the target frequency is a frequency at which an output current of the antenna drive unit 130 (hereinafter, also referred to as LSI current) becomes minimum or maximum.

That is, the predetermined frequency and the target frequency are specific values that depend on manufacturers or product models.

The output unit 135 includes a pair of differential amplifiers A1, A2. The pair of differential amplifiers A1, A2 output high-frequency oscillation signals supplied from the oscillation unit 131, as a positive-phase oscillation signal and a negative-phase oscillation signal.

The measurement unit is connected to input and output terminals of the differential amplifier A1 of the output unit 135. The measurement unit measures an output current of the differential amplifier A1 (I_lsi; hereinafter, referred to as LSI current). The LSI current is measured by converting a voltage difference between a voltage V1 of an oscillation signal input into the differential amplifier A1 and a voltage V2 of a positive-phase oscillation signal output from the differential amplifier A1 with an output resistance. The measurement unit supplies a result of measurement to the control unit 140 via the ADC 134.

The control unit 140 has a function of controlling an R/W function and a card function of the non-contact communication apparatus. The R/W function is a function of the non-contact communication apparatus communicating with (reading and writing of data from/in) the reception apparatus 200 that is the secondary device (opposite device), the non-contact communication apparatus serving as the transmission apparatus shown in FIG. 1. The card function is a function of the reception apparatus 200 that is the secondary device shown in FIG. 1. It means that the non-contact communication apparatus has that function.

The control unit 140 controls a control voltage applied on the variable capacitor VC1 such that the resonant frequency of the antenna resonant unit 110 becomes a set predetermined frequency. The DAC 133 converts a digital control voltage value output from the control unit 140 into an analog control voltage signal Vcnt and applies it on the variable capacitor VC1 via a control signal line 119 of the antenna resonant unit 110. With this, it becomes possible to change impedance of the antenna resonant unit 110 at high speed, 1 ms or less. Note that the control unit 140 is constituted of, for example, a CPU (Central Processing Unit).

In the antenna drive unit 130, a terminal or line, into which a control voltage value from the control unit 140 is input, is a control value input unit 139.

Figure 3:
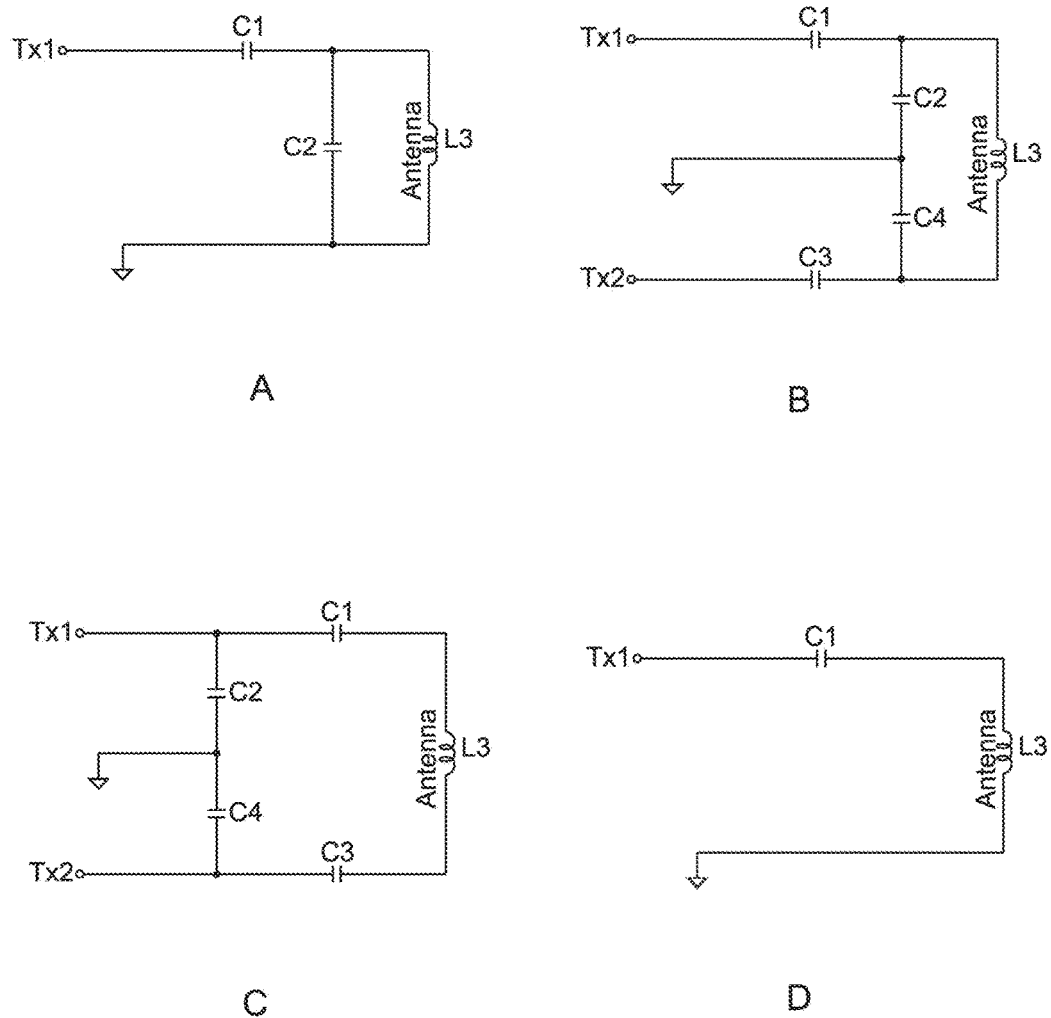
FIG. 3 A of FIG. 3 shows a single driving type impedance matching circuit and B of FIG. 3 shows a differential driving type impedance matching circuit. C of FIG. 3 shows a modified example of B of FIG. 3 and D of FIG. 3 shows a modified example of A of FIG. 3.

As a basic matching circuit used in non-contact communication of an NFC system or the like, there is a circuit configuration of a type shown in each of A to D of FIG. 3. The type shown in A of FIG. 3 is a single driving type that drives the antenna coil L3 by a single channel. The type shown in B of FIG. 3 is a differential driving type that drives the antenna coil L3 by two channels. Both are the same in the basic operation. A Tx1 terminal and a Tx2 terminal are driving terminals of the antenna drive unit 130. A matching circuit shown in C of FIG. 3 is a modified example of B of FIG. 3 and used in non-contact communication as in B of FIG. 3. A matching circuit shown in D of FIG. 3 is a modified example of A of FIG. 3, has a configuration of a series resonant circuit, and is often used in non-contact feeding.

The antenna resonant unit 110 in the non-contact communication apparatus has a circuit configuration of a differential driving type that drives the antenna coil L3 by two channels.

In FIG. 2, lines in the antenna resonant unit 110, which are connected to the Tx1 and Tx2 terminals, are input lines 129 into which oscillation signals from the oscillation unit 131 are input. With two channels, two input lines 129 are provided. With a single channel, a single input line 129 is provided.

On the R/W mode, the control unit 140 causes the oscillation unit 131 to oscillate at an arbitrary frequency in the above-mentioned frequency range and performs control such that a positive-phase oscillation signal and a negative-phase oscillation signal each having that frequency are output from the output unit 135 to the Tx1 terminal and the Tx2 terminal.

On the card mode, the control unit 140 detects a reception signal induced by the antenna coil L3 of the antenna resonant unit 110 through a reception circuit (not shown) and performs response control using load modulation.

Figure 4:
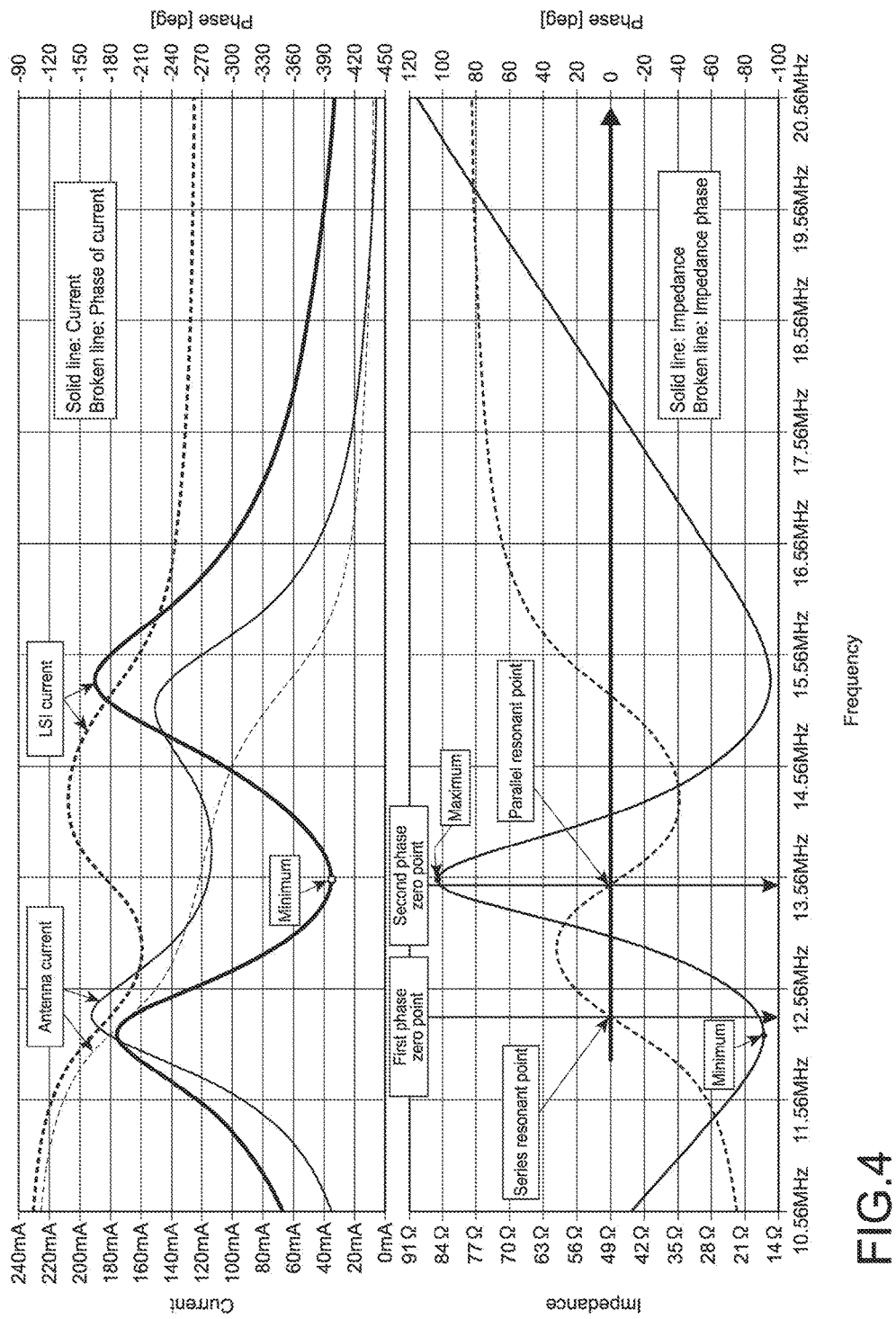
FIG. 4 An upper part of FIG. 4 is a graph showing characteristics of an LSI current and a phase thereof, an antenna current flowing through an antenna and a phase thereof. A lower part of FIG. 4 is a graph showing characteristics of impedance and a phase thereof as the antenna is viewed from an antenna drive unit.

An upper part of FIG. 4 is a graph showing characteristics of an LSI current and a phase thereof, an antenna current flowing through the antenna coil L3 and a phase thereof. A lower part of FIG. 4 is a graph showing characteristics of impedance (impedance as antenna is viewed from antenna drive unit 130) and a phase thereof. The solid line is impedance ($\Omega$) and the broken line is the phase (deg). The horizontal axis is the frequency. The upper left vertical axis is a current value and the right vertical axis is a phase. The lower left vertical axis is impedance and the lower right vertical axis is a phase.

As in this embodiment, in the series-parallel resonant circuit, as shown in the lower graph, there are two resonant points at which the impedance phase becomes 0 (first phase zero point, second phase zero point). The resonant point having a lower frequency is a point at which the impedance phase changes from minus to plus. The resonant point is a series resonant point formed by mostly capacitors C2 and C5 that are series resonant capacitor units and the antenna coil L3. There is a frequency at which the impedance becomes minimum due to series resonance. Due to influence of the variable capacitor VC1 that is the parallel resonant capacitor and the like in the series-parallel resonant circuit, the impedance becomes minimum at a frequency lower than the frequency of the phase 0.

The resonant point having a higher frequency is a point at which the impedance phase changes from plus to minus. The resonant point is a parallel resonant point formed by mostly the variable capacitor VC1 and the antenna coil L3. There is a frequency at which the impedance becomes maximum due to parallel resonance. Due to influence of the capacitors C2 and C5 that are the series resonant capacitor in the series-parallel resonant circuit, the impedance becomes maximum at a higher frequency than the frequency of the phase 0.

Here, in general design, two methods are present. One is that the series resonant point is adjusted to a system frequency (e.g., 13.56 MHz) and the other is that the parallel resonant point is adjusted to the system frequency. Either of them is selected in a manner that depends on LSI to be used.

Figure 5:
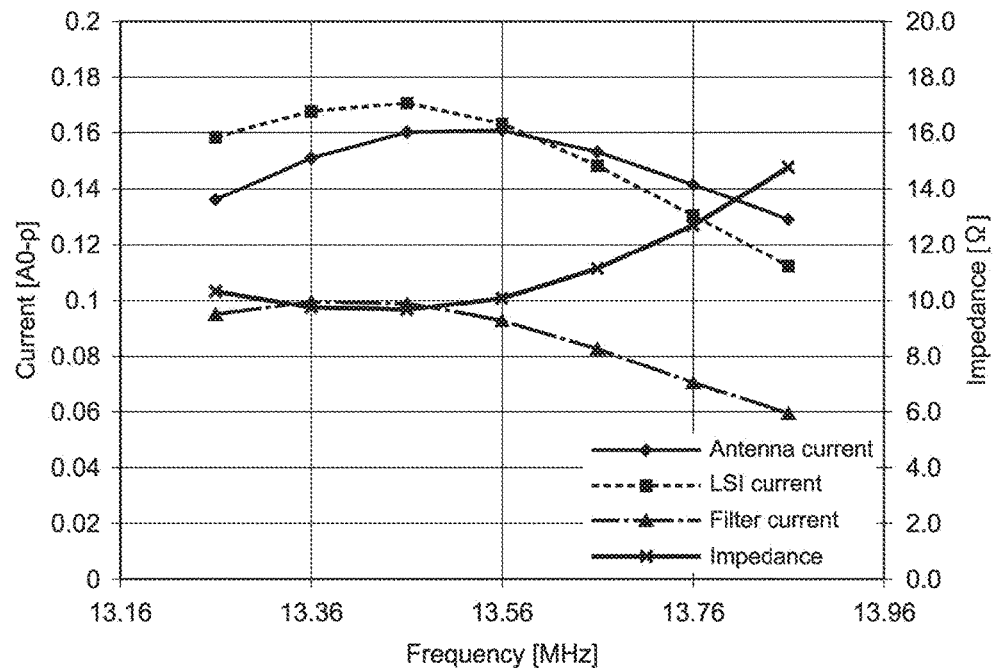
FIG. 5 is a graph showing deviation between a resonant point (frequency of phase 0) and a frequency with minimum impedance in an enlarged state.

An amount of deviation between the resonant point (frequency of phase 0) and the frequency at which the impedance is minimum or maximum varies in a manner that depends on the inductance. Q-factor, impedance, and the like of the antenna coil. FIG. 5 is a graph showing this deviation in an enlarged state. This graph shows results obtained by changing the oscillation frequency of the oscillation unit 131 with each of the series and parallel resonant capacitors being fixed and calculating impedance of the antenna and each current of the antenna resonant unit 110. Here, an antenna of L=1.25 uH is used, the series resonant point is adjusted to, for example, 13.56 MHz, and design is performed with impedance Z=8$\Omega$ (low impedance type). (On the contrary, FIG. 4 shows an example in which the parallel resonant point is adjusted to 13.56 MHz.) Each current is an antenna current, an LSI current, or a filter current (current flowing through the filter unit 120).

As shown in FIG. 5, although the antenna current has a peak at 13.56 MHz as it is designed, the frequency at which the impedance becomes minimum and the frequency at which the LSI current becomes maximum is deviated to 13.46 MHz that is a frequency lower by about 100 KHz than 13.56 MHz.

In this manner, deviation between the resonant point (frequency of phase 0) (see FIG. 4) and the frequency at which the impedance is minimum or maximum occurs. Therefore, for correcting this deviation, as described above, the target frequency based on the offset value (amount of deviation) is set. For example, it is calculated and measured for each product model and an offset value thereof is determined.

Here, a low-impedance antenna device of a type that adjusts the series resonant point to 13.56 MHz is easily influenced by an output resistance of LSI, and it is generally used in combination with LSI having an output resistance equal to or lower than 1$\Omega$. Due to the use of the series resonant point, a change in impedance is small with respect to resonant frequency deviation and it is stable near the resonant point.

On the other hand, when the output resistance of the LSI is high, a high-impedance antenna device (e.g., see graph shown in FIG. 4) of a type that adjusts the parallel resonant point to 13.56 MHz is hardly influenced by it, and hence the output resistance is generally used in combination with LSI having several Ω. There is a merit that an LSI current can be reduced by utilizing the parallel resonant point to increase the impedance.

The example shown in FIG. 4 shows characteristics of a high-impedance (e.g., 80Ω) antenna device of the type that adjusts the parallel resonant point to 13.56 MHz as described above. Here, in this embodiment, an example in which a matching constant of the high-impedance antenna device is designed will be mainly described.

Figure 6:
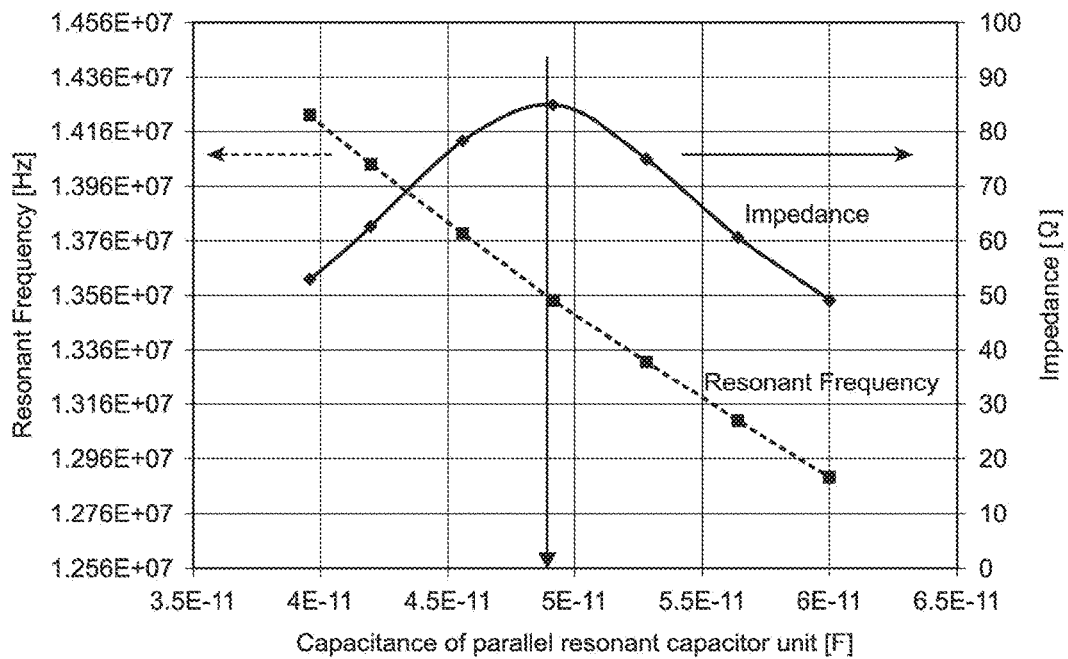
FIG. 6 is a graph showing a general relationship between the capacitance of the parallel resonant capacitor and impedance at a resonant frequency.

FIG. 6 is a graph showing a general relationship between the capacitance and impedance of the parallel resonant capacitor unit having a resonant frequency. (Note that the relationship (characteristics) regarding this graph is general while numerical values per se are not general.) The inductance of the antenna coil is 1.25 μH. The relationship between the resonant frequency and the capacitance can be linearly approximated. The impedance is a peak near 13.56 MHz. It can be seen that the resonant frequency and impedance can be changed by changing the capacitance of the parallel resonant capacitor.

Figure 7:
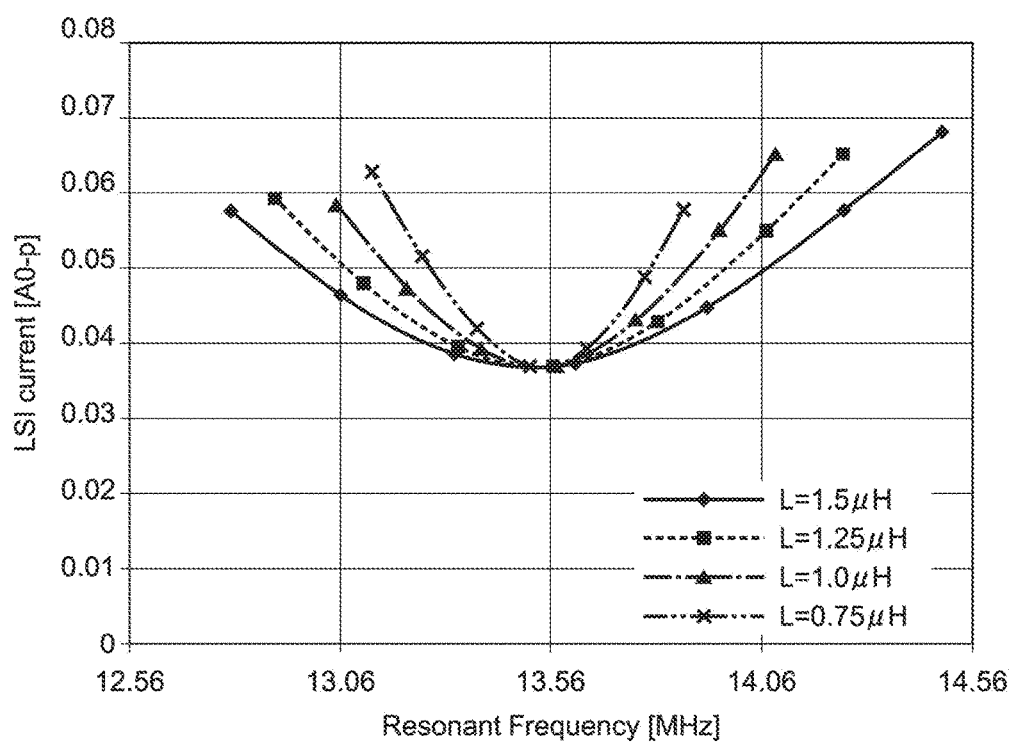
FIG. 7 is a graph showing a relationship between a resonant frequency and an LSI current at different inductances of the antenna coil.

FIG. 7 is a graph showing a relationship between the resonant frequency and the LSI current with different inductances (L=0.75 μH, 1.0 μH, 1.25 μH, 1.5 μH) of the antenna coil. Minimum values of the LSI current are equal irrespective of the inductances of the antenna coil. With this, it can be seen that, irrespective of the inductances, resonant frequency≈frequency with minimum LSI current is established. That is, the inventor of the present disclosure found that, when an oscillation frequency offset from a predetermined frequency is used as the target frequency, to thereby change the capacitance of the parallel resonant capacitor of the series-parallel resonant circuit, and the parallel resonant point is used for tuning the resonant frequency, it is only necessary to measure an LSI current while changing the capacitance of the parallel resonant capacitor and to detect a minimum value thereof. When the series resonant point is used for tuning the resonant frequency, the maximum value of the LSI current may be detected while changing the capacitance of the parallel resonant capacitor on the contrary.

In this manner, as shown in FIG. 4, deviation occurs between the resonant frequency that the phase actually becomes 0 and the frequency at which the impedance becomes maximum (LSI current becomes minimum). Therefore, as described above, a designer estimates a predetermined frequency and an amount of deviation (offset value) from it in advance on the basis of the design values (inductance, Q-factor, impedance, etc.) of the antenna resonant unit 110 and the frequency at which the LSI current becomes minimum and stores those values in the storage unit 141 (see FIG. 2), for example. In this case, a target frequency that is a frequency obtained by offsetting may be stored or a predetermined frequency and an offset value may be both stored.

The control unit 140 outputs an optimal control value that is a control voltage signal to the variable capacitor VC1, for obtaining the minimum value of the LSI current in order to obtain this target frequency. In this case, for example, as shown in FIG. 4, when the parallel resonant point is deviated to a lower level from a predetermined frequency (typically 13.56 MHz), it is set to be lower by an amount corresponding to the offset value than the parallel resonant point as a frequency for tuning, that is, a target frequency.

Also when the parallel resonant capacitor of the series-parallel resonant circuit, that is, the variable capacitor VC1 is changed and the series resonant point is used for tuning the resonant frequency, it is performed in the same way as described above. In this case, deviation occurs between the resonant frequency at which the phase 0 is actually obtained and the frequency at which the impedance becomes minimum as shown in FIG. 4. The series resonant point is deviated to a higher level from a predetermined frequency (typically 13.56 MHz), it only has to be set to be higher by an amount corresponding to the offset value than the series resonant point, as the target frequency.

As described above, a frequency deviated from 13.56 MHz, which is empirically obtained such that the communication characteristics are optimized, may be set as the target frequency by some manufacturers.

By performing tuning using the LSI current, not the antenna current shown in Patent Literature 1, the non-contact communication apparatus according to this embodiment can install a tuning function in the LSI at low costs, which will be described later again. It should be noted that, as shown in FIG. 5, the resonant frequency at which the impedance phase (see FIG. 4) becomes 0 and the maximum value of the antenna current are often equal to each other while the minimum or maximum value of the LSI current is deviated, and hence this is an error factor. Therefore, correcting such deviation as the offset enables accurate tuning to be performed.

As described above, other than storing the offset value as the frequency, the frequency offset may be converted into a capacitance offset in the basis of the capacitance-to-resonant frequency characteristics shown in FIG. 6, for example, and the offset value may be stored as a voltage value equivalent to that capacitance offset. In this case, in a manufacture process, tuning of the resonant frequency is executed at a predetermined frequency without an offset, and a voltage equivalent to the above-mentioned offset is added to the determined voltage value, and thus an effect equivalent to that of the frequency offset can be obtained. In this case, the frequency offset is unnecessary. Therefore, when the predetermined frequency is 13.56 MHz that is the system frequency, the oscillation unit 131 can set the oscillation frequency to a fixed frequency of 13.56 MHz. There is a merit that it makes the circuit of the LSI simple.

Processing of Non-Contact Communication Apparatus

Upon Shipment from Factory

Figure 8:
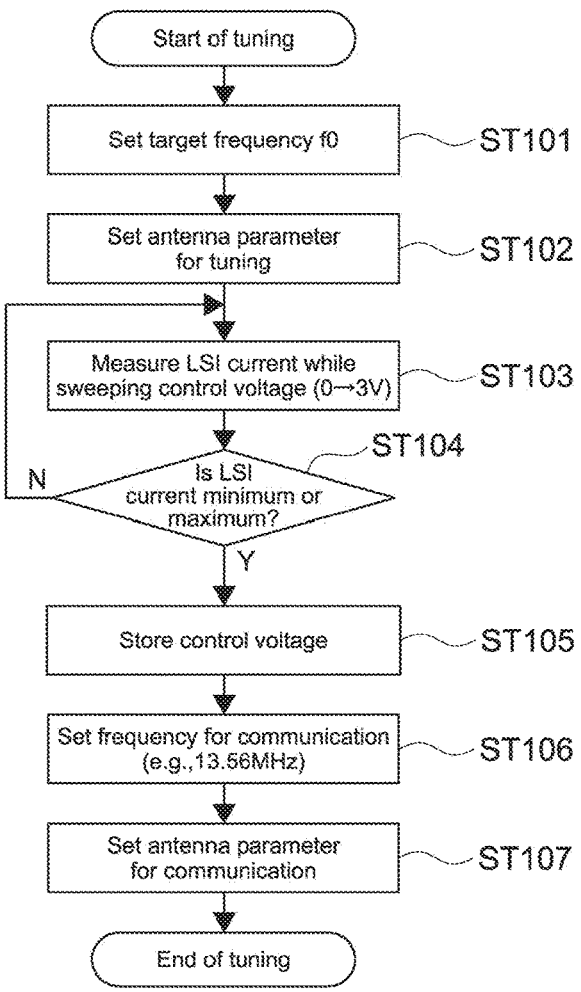
FIG. 8 is a flowchart showing processing in which the non-contact communication apparatus automatically tunes the resonant frequency upon shipment of the non-contact communication apparatus from a factory.

FIG. 8 is a flowchart showing processing in which the non-contact communication apparatus automatically tunes the resonant frequency upon shipment of this non-contact communication apparatus from a factory.

For initialization, the control unit 140 reads out a target frequency f0, which is offset from a predetermined frequency, from the storage unit 141 and sets it in the oscillation unit 131 (Step 101).

For initialization, the control unit 140 sets antenna parameters, which are stored in the storage unit 141 in advance, in an internal resistor of the control unit 140, the gain controller 132, and the like (Step 102). The antenna parameters are, for example, impedance, a Q-factor, a gain of an oscillation signal output from the oscillation unit 131, and a control voltage value (here, for example, 0 V as initial value) of the DAC 133 for the variable capacitor VC1.

The control unit 140 increases the control voltage value for the DAC 133 by unit voltage step by step from 0 V, for example, and measures an LSI current in each step with the measurement unit (Step 103). For example, the control unit 140 increases the control voltage value up to 3 V that is the maximum value of the system voltage. When the control unit 140 detects the minimum value of the LSI current in a range from 0 to 3 V (YES in Step 104), the control unit 140 stores an optimal control value that is the control voltage value for the DAC 133 when the LSI current is minimum, in the storage unit 141 (Step 105).

Note that the control unit 140 does not necessarily need to increase the control voltage value up to 3 V and only has to proceed to Step 105 when the control unit 140 detects the minimum value while increasing the control voltage value from 0 V.

When the low-impedance antenna resonant unit 110 of the type that adjusts the series resonant point to the target frequency is used, the maximum value of the LSI current is detected in Step 104.

After that, the control unit 140 sets an oscillation frequency for communication (e.g., 13.56 MHz) in the oscillation unit 131 (Step 106). The control unit 140 sets antenna parameters for communication (Step 107), and terminates the tuning processing. As one of the communication antenna parameters, there is an optimal control value stored in the storage unit 141. That is, during communication, the control unit 140 controls the resonant frequency by using the optimal control value stored in the storage unit 141.

Note that, as will be described later again, as the communication antenna parameters, there are parameters different from that for tuning. One of such parameters is, for example, the gain of the oscillation signal of the oscillation unit 131.

Figure 9:
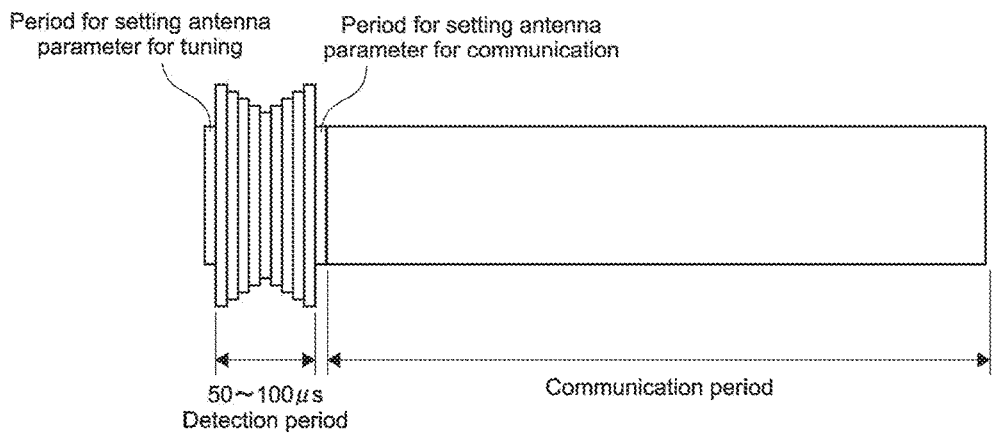
FIG. 9 shows a timing chart of the processing shown in FIG. 8.

FIG. 9 shows a timing chart of the processing shown in FIG. 8. The horizontal direction schematically shows time elapse and the vertical direction schematically shows an LSI current value. After setting antenna parameters for tuning, the control unit 140 increases the control voltage value for the DAC 133 by unit voltage step by step, to thereby detect a change in LSI current and detect a minimum value (or maximum value). After that, the antenna parameters for communication are set and communication is performed.

A detection period for the minimum value (or maximum value) of the LSI current is desirably 50 to 100 μs. It is a value sufficiently smaller than 300 ms of a discovery time to be described later.

Here, as shown in FIG. 9, as the magnitude of the LSI current, that is, the gain of the oscillation signal from the output unit 135, such a gain is set such that a value (second value) in the detection period is larger than a value (first value) in the communication. With this, the SN ratio of a current signal can be increased at the time of the detection. Therefore, the control unit 140 can obtain an accurate optimal control value. For example, the second value is favorably 1.5 times to twice as large as the first value. It is set within a range of an allowable current of LSI.

After Shipment from Factory

Figure 10:
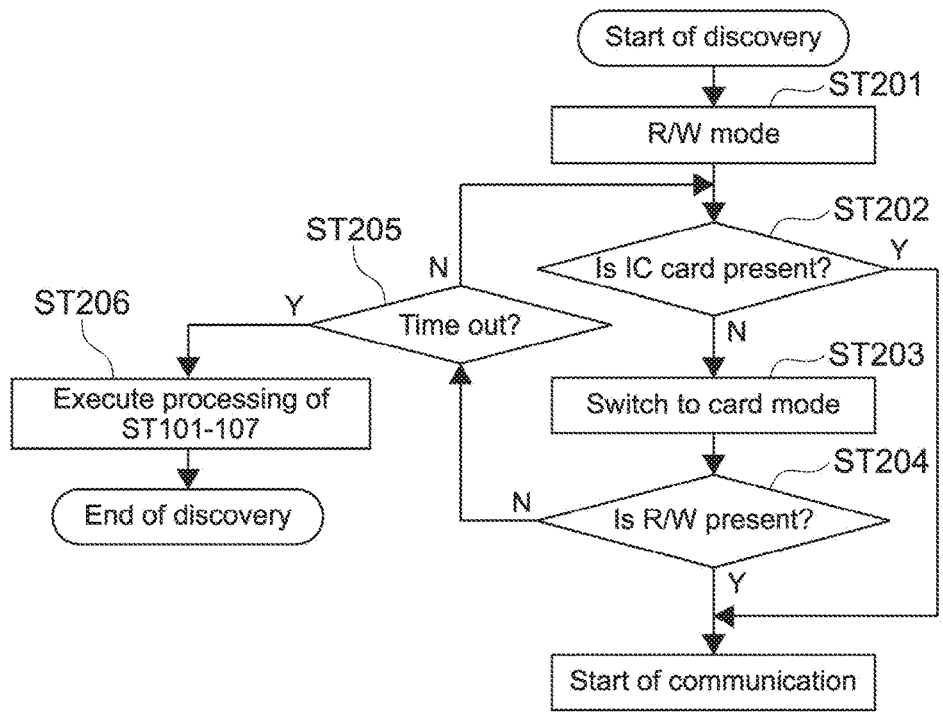
FIG. 10 is a flowchart showing processing in which the non-contact communication apparatus automatically tunes the resonant frequency of the non-contact communication apparatus after shipment from a factory.

FIG. 10 is a flowchart showing processing in which the non-contact communication apparatus automatically tunes the resonant frequency when the user uses this non-contact communication apparatus after shipment of the non-contact communication apparatus from a factory, for example. In the tuning processing according to this embodiment, the tuning processing shown in FIG. 8 is performed when the non-contact communication apparatus (or electronic device installing it) satisfies a predetermined condition during discovery processing. The discovery processing is, for example, processing in which, when the non-contact communication apparatus has both of the R/W function and the card function, the non-contact communication apparatus alternately serves as a device having the R/W function and a device having the card function and detects the secondary device. Specifically, the following processing is performed.

When the initial mode is the R/W mode (Step 201), the control unit 140 monitors whether or not an IC card, for example, that is the secondary device is present near it (Step 202). In Step 202, the non-contact communication apparatus outputs oscillation signals at predetermined time intervals, to thereby detect the presence or absence of it.

The control unit 140 starts communication when the IC card is present, or the operation mode is switched from the R/W mode to the card mode when it is not present (Step 203). Then, the control unit 140 monitors whether or not a R/W that is the opposite device is present (Step 204).

The control unit 140 starts communication when the R/W is present, or detects whether or not a time-out occurs when it is not present (Step 205). The control unit 140 only needs to start a count-up performed by the timer at a timing of switching to the card mode in Step 203, for example, and repeat the processing of Step 202 to 204 until a time-out occurs.

When a time-out occurs in Step 205, for example, in order to reduce power consumption of the non-contact communication apparatus, the discovery is stopped and a low-power consumption mode such as standby is started. Then, the control unit 140 executes the tuning processing of Step 101 to 107 shown in FIG. 8 (Step 206). With this, the discovery processing is terminated.

When a time-out occurs in Step 205, mostly, it is assumed that the IC card and the R/W are both not present and the user is using the non-contact communication apparatus as a device having another function (or not using it). Therefore, in this case, it can be considered as a stable situation without disturbance for the non-contact communication apparatus, and hence it is an optimal time to perform the tuning processing after shipment from a factory. Therefore, when a time-out occurs, the discovery processing is generally terminated as it is. However, in this embodiment, the tuning processing shown in FIG. 8 is executed in such a case.

In this example, the description is made assuming that the processing of ST101 to ST107 of FIG. 8, that is, detection of the minimum or maximum of the LSI current is performed in Step 206 in which the tuning processing is performed. However, by detecting other values instead of such tuning processing, the optimal control value may be detected and the tuning processing may be executed. As such other values, Examples 1) to 4) as follows are exemplified.
1) Control voltage value such that the phase of the antenna current that is the current flowing through the antenna coil becomes 0,
2) Control voltage value such that the antenna current becomes minimum or maximum,
3) Control voltage value such that the phase of the antenna impedance becomes 0,
4) Control voltage value such that the phase of the LSI current becomes 0

The point such that each of the phases of Examples 1), 3), 4) becomes 0 is equivalent to a point of phase 0° of a curve shown by the broken line in FIG. 4.

It should be noted that FIG. 4 shows simulation results, a point of −270° is equivalent to the original phase 0° with respect to the phase of the antenna current of Example 1), and a point of −180° is equivalent to the original phase 0° with respect to the phase of the LSI current of Example 4).

The tuning period is approximately 50 to 100 μs as described above. Therefore, the power consumption therefor is substantially ignorable and the user is not aware of the tuning processing.

Figure 11:
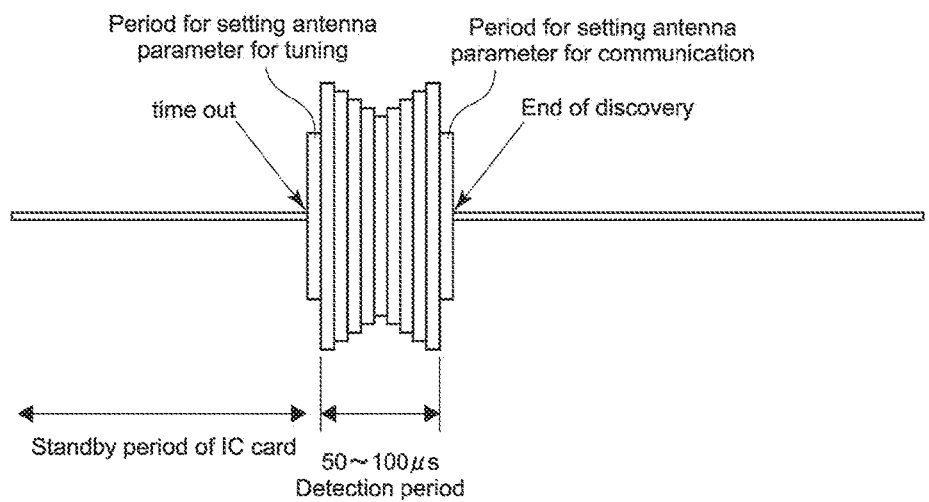
FIG. 11 shows a timing chart of the processing shown in FIG. 10.

FIG. 11 shows a timing chart of the processing shown in FIG. 10. This timing chart should be viewed in a way similar to that of shown in FIG. 9. A standby period of the IC card of Steps 201 and 202 described above, and a period for setting the antenna parameters for tuning, a detection period for the minimum value or maximum value of the LSI current, and a period for setting the antenna parameters for communication, each of which is the processing shown in FIG. 8, are provided. After termination of the standby period and discovery of the IC card, an LSI current value in a vertical direction is minimum (actually, no current may flow). It shows a state in which no oscillation signals are generated.

In this example, the case where the non-contact communication apparatus has both of the R/W function and the card function has been described. However, also in a non-contact communication apparatus having only the R/W function or the card function, similar processing can be performed. For example, when only the R/W function is provided, the non-contact communication apparatus only needs to monitor whether or not an IC card is present near it as the R/W function, and waits for a time out when the presence thereof is not detected. When only the card function is provided, the non-contact communication apparatus only needs to monitor whether or not a R/W is present near it as the card function and waits for a time out when the presence thereof is not detected.

Conclusion

As described above, in the non-contact communication apparatus according to this embodiment, the measurement unit measures an output current from the oscillation unit 131, and the control unit 140 detects a minimum value or maximum value of the output current and controls a resonant frequency by using an optimal control value corresponding to the minimum value or maximum value. Therefore, even if the resonant frequency fluctuates due to variations in antenna characteristics in manufacture or due to a usage environment or aging, satisfactory communication characteristics at a set resonant frequency can be obtained.

In the non-contact communication apparatus according to this embodiment, the differential amplifier A3 that is the measurement unit having an LSI current is provided in the antenna drive unit 130. Therefore, it is unnecessary to provide a resistor or wire for monitoring an antenna current in the antenna resonant unit 110 as in Patent Literature 1, between the antenna resonant unit 110 and the antenna drive unit 130. Further, it is also unnecessary to increase the number of terminals of the antenna drive unit 130 for it. Thus, a simple circuit configuration can be provided. With this, it is possible to facilitate design of the antenna drive unit 130 and reduce the cost. Further, with this, noise can be reduced and satisfactory communication characteristics can be obtained.

The non-contact communication apparatus according to this embodiment is configured to be capable of automatically performing tuning upon shipment from a factory. Thus, it does not require manual tuning of a worker in a manufacturing line. With this, the cost can be reduced.

The above-mentioned optimal control value upon shipment from a factory and the optimal control value required when the user uses the non-contact communication apparatus may differ from each other due to a usage environment of the non-contact communication apparatus or aging of the antenna resonant unit 110. The non-contact communication apparatus according to this embodiment is configured to be capable of automatic tuning even when the user uses it after shipment from a factory, and hence satisfactory communication characteristics can be maintained.

Second Embodiment

Next, a second embodiment of the present invention will be described. Hereinafter, elements substantially similar to the members, functions, and the like of the apparatus according to the first embodiment will be denoted by identical symbols, descriptions thereof will be simplified or omitted, and different points will be mainly described.

Figure 12:
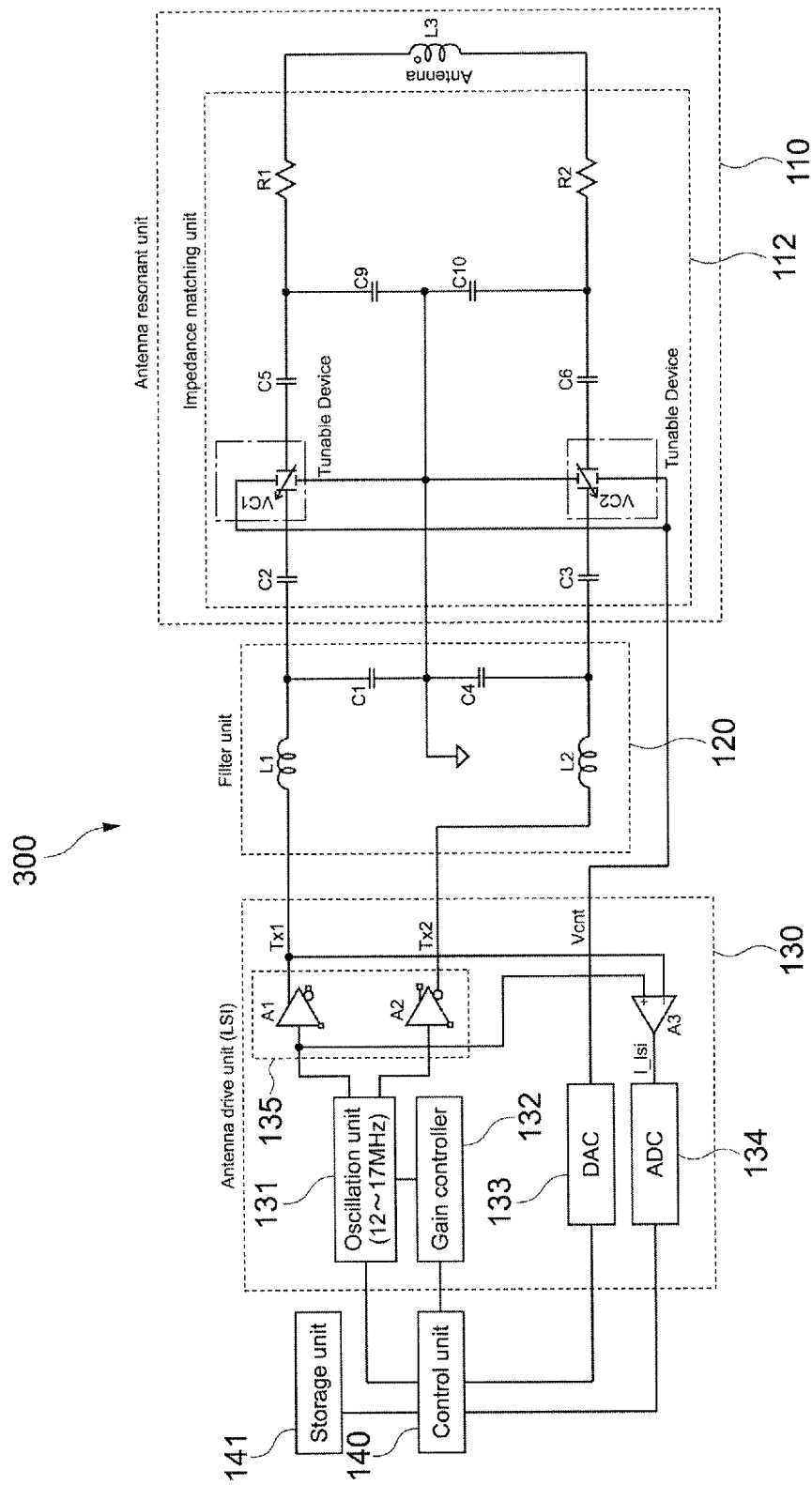
FIG. 12 shows a circuit configuration of a non-contact communication apparatus according to a second embodiment of the present invention.

FIG. 12 shows a circuit configuration of a non-contact communication apparatus according to the second embodiment. A capacitor unit of this non-contact communication apparatus 300 includes, as in the above-mentioned embodiment, a series resonant capacitor unit and a parallel resonant capacitor unit. As a different point from that of the above-mentioned embodiment, the series resonant capacitor unit includes, for example, two variable capacitors VC1, VC2 and the parallel resonant capacitor unit includes, for example, two fixed-capacitance capacitors C9, C10. Capacitors C2, C5 for DC cut are connected in series to the variable capacitor VC1 and capacitors C3, C6 are also connected in series to the variable capacitor VC2. A control unit 140 outputs a control voltage signal Vcnt to the variable capacitors VC1, VC2 via a DAC 133 provided in an antenna drive unit 130 and variably controls capacitances thereof.

In this manner, the capacitance of the series resonant capacitor unit is variably controlled, and hence, as in the above-mentioned first embodiment, fluctuations in resonant frequency due to various factors can be cancelled and satisfactory communication characteristics can be obtained.

Third Embodiment

Figure 13:
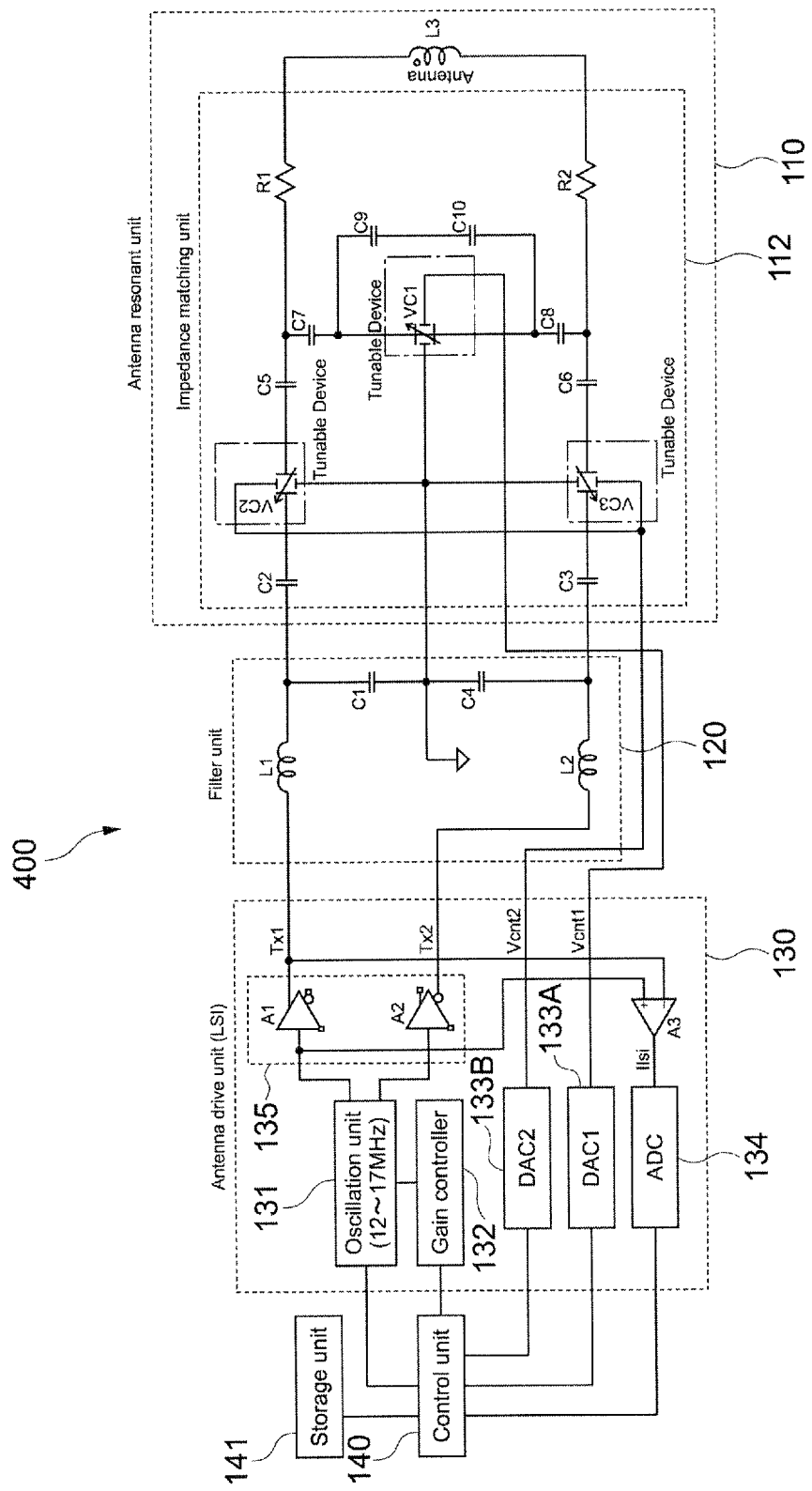
FIG. 13 shows a circuit configuration of a non-contact communication apparatus according to a third embodiment of the present invention.

FIG. 13 shows a circuit configuration of a non-contact communication apparatus according to a third embodiment of the present invention. In this non-contact communication apparatus 400, both of a series resonant capacitor unit and a parallel resonant capacitor unit, which serve as the capacitor unit, include a variable-capacitance capacitor. The parallel resonant capacitor unit is constituted of a variable capacitor VC1 similar to that shown in FIG. 2. The series resonant capacitor unit is constituted of two variable capacitors VC2, VC3 similar to those shown in FIG. 12.

A control unit 140 outputs a control voltage signal Vcnt1 to the variable capacitor VC1 via a DAC (1) 135A and outputs a control voltage signal Vcnt2 to variable capacitors VC2, VC3 via a DAC (2) 135B, and variably controls capacitances thereof. In this embodiment, when the capacitance of the parallel resonant capacitor unit (variable capacitor VC1) is changed, a change in capacitance of the series resonant capacitor unit (variable capacitors VC2, VC3), which corresponds to that change, is required. Therefore, tracking control is performed.

Specifically, for example, a capacitance of an optimal series resonant capacitor unit (or a control value of a DAC (2) 133B corresponding thereto) is associated with a change in capacitance of the parallel resonant capacitor unit (or a control value of a DAC (1) 133A corresponding thereto) and it only needs to be stored in the storage unit 141 as a table in advance. Then, in the tuning processing, the control unit 140 obtains an optimal control value in Step 105 in the flowchart shown in FIG. 8 and obtains an optimal control value for the series resonant capacitor unit, which corresponds to the optimal control value, on the basis of the table. In this manner, it is possible to optimally control the resonant frequency.

Fourth Embodiment

Figure 14:
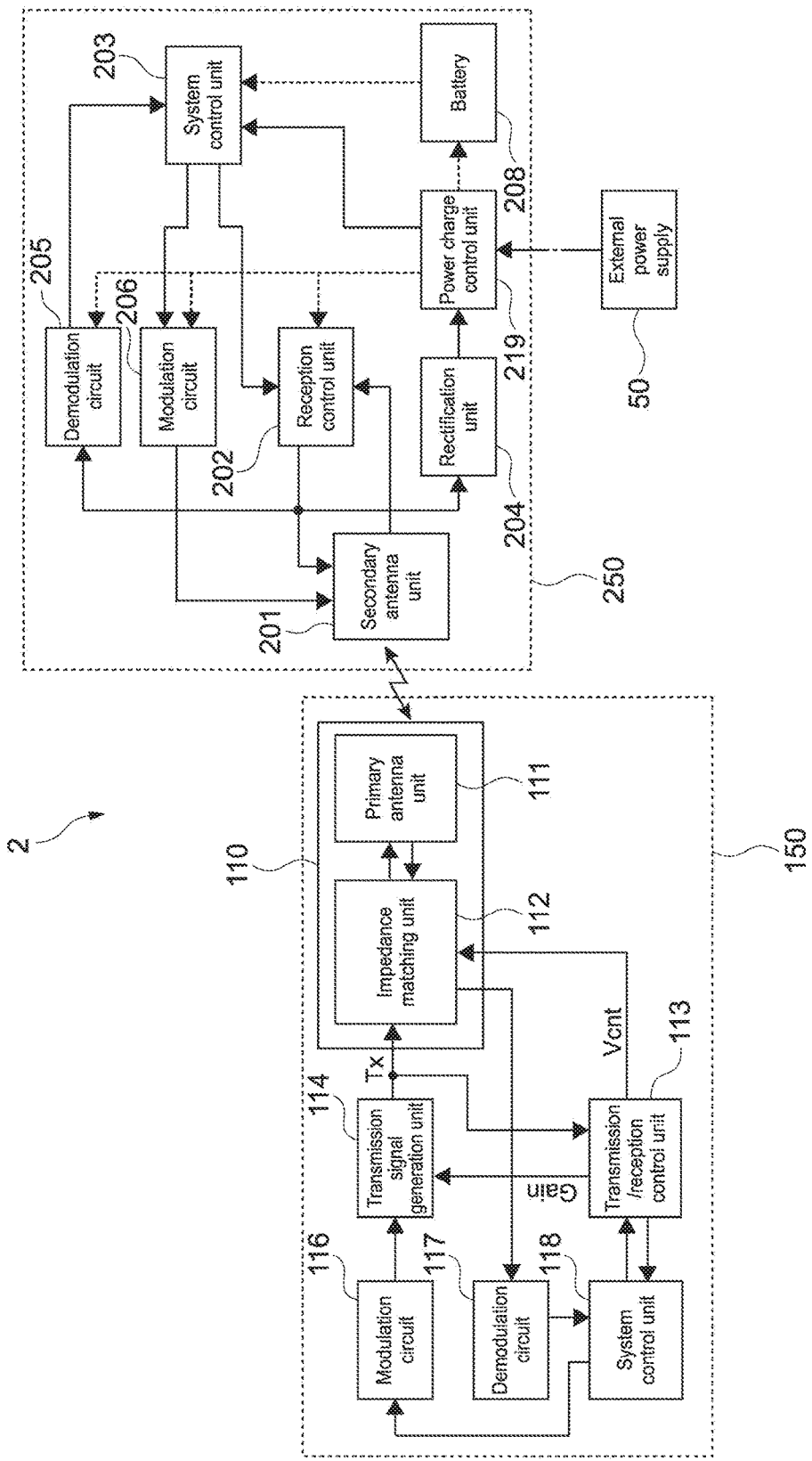
FIG. 14 is a block diagram showing a configuration of a non-contact feeding system according to an embodiment in which the technology of the non-contact communication system shown in FIG. 1 is applied to a non-contact feeding system 2.

FIG. 14 is a block diagram showing a configuration of this non-contact feeding system 2 according to an embodiment in which the technology of the above-mentioned non-contact communication system 1 (see FIG. 1) is applied to the non-contact feeding system 2. Also in the non-contact feeding system 2, data communication is performed. This point is the same as the non-contact communication system 1. Different points of the non-contact feeding system 2 from the non-contact communication system 1 shown in FIG. 1 are in that a feeding mode is provided and that a power reception apparatus 250 is provided with a power charge control unit 219. Here, a method corresponding to bidirectional communication for transmission and reception is shown.

An antenna resonant unit 110 of a feeding apparatus 150 is constituted of an LC resonant circuit. For example, the antenna resonant unit 110 has an output frequency of 100 to 200 kHz in an electromagnetic induction method known as a Qi format. When the system allows a plurality of methods as a format in this manner, an oscillation frequency used by the LSI (antenna drive unit 130) and specifications of an antenna coil in the antenna resonant unit 110 differ.

A method such as electromagnetic induction and the magnetic field resonance is applicable as a feeding method for the non-contact feeding system 2 and any methods can be employed. The feeding apparatus 150 transmits a carrier signal and causes a current to flow through the antenna via the primary antenna unit 111. A magnetic field generated due to the current flowing through the antenna coil is magnetically coupled to the secondary antenna unit 201 of the power reception apparatus 250, a voltage is excited in the secondary antenna unit 201, and energy is transferred.

In the communication state of the non-contact communication system 1, a communication distance between the transmission apparatus 100 and the reception apparatus 200 is long and the distance changes. However, for example, in the electromagnetic induction method known as the Qi format, which is a feeding method, the power reception apparatus 250 (e.g., portable telephone device) is placed in the feeding apparatus 150 (e.g., feeding transmission pad), and hence the distance between both is always approximately constant. Such a non-contact feeding system 2 includes a resonant circuit in each of the feeding apparatus 150 and the power reception apparatus 250. A problem in that the resonant frequency is deviated due to position deviation and a device to be fed with power is the same as the problem of the above-mentioned non-contact communication system 1 (solved by the non-contact communication system 1).

Specifically, the primary antenna unit 111 and the secondary antenna unit 201 is constituted of a resonant circuit to resonate at a carrier frequency for performing efficient transfer. In general, the energy efficiency is determined by multiplication of a coupling coefficient k of electromagnetic induction coupling and the Q-factor of the antenna, and hence k and Q are desirably larger. However, when Q of the resonant circuit is increased, the resonant frequency is greatly deviated due to a variation in constant. Therefore, it is necessary to use very high-precision components or control the resonant frequency as described above.

Figure 15:
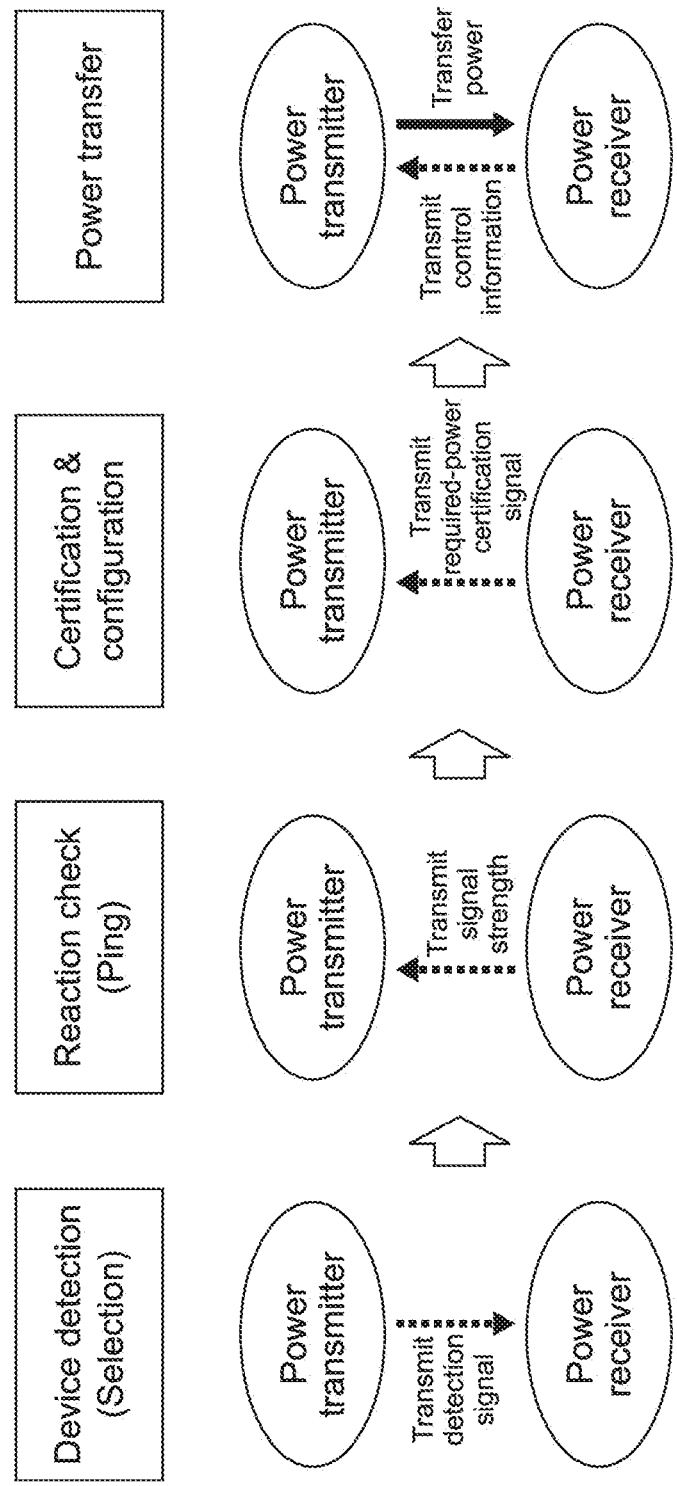
FIG. 15 shows a sequence from detection of a power reception apparatus (device detection) in the feeding apparatus to power charge (power transfer).

FIG. 15 shows a sequence from detection (device detection) of the power reception apparatus in the feeding apparatus 150 up to power charge (power transfer). The non-contact feeding system 2 performs data communication by transferring energy and modulating the magnitude of a carrier signal, and requests device certification or a necessary amount of power to be received. For example, in the Qi format, the power reception apparatus 250 modulates the carrier by load modulation, that is, changing the magnitude of the load. With this, various types of data are sent.

For non-contact feeding, in general, the feeding apparatus 150 causes a current to intermittently flow through the primary antenna unit 111 for a short time of approximately 50 to 100 μs and determines that the power reception apparatus 250 is placed when the current value changes. It is equivalent to reaction check (PING). Regarding the term "signal strength" shown in FIG. 15, the feeding apparatus 150 actually detects a change in current of the primary antenna unit 111. Therefore, in such a state in which the current does not change, the feeding apparatus 150 starts the tuning processing shown in FIG. 8, to thereby perform tuning in a manner similar to that of the above-mentioned embodiments also after product shipment from a factory. In the case where the certification is OK, the feeding apparatus 150 operates on a power transfer mode and transfers power to the power reception apparatus 250. In this case, the feeding apparatus 150 performs long-time power charge, and hence ensures safety by intermittently performing recognition processing.

Other Embodiments

The present invention is not limited to the above-mentioned embodiments and various other embodiments can be implemented.

In each of the above-mentioned embodiments, during the communication, the control unit 140 controls the resonant frequency by using the optimal control value as the control voltage value for the variable capacitor VC1. However, it is not necessarily limited to the optimal control value and the resonant frequency may be controlled by a control value corresponding to a value near the minimum or maximum value of the LSI current, for example. That is, the control unit 140 may control the resonant frequency with a control value within an arbitrary range including an optimal control value.

In each of the above-mentioned first and second embodiments, the parallel resonant capacitor unit is constituted of the single variable capacitor VC1. However, the parallel resonant capacitor unit may be constituted of a plurality of variable capacitors.

In each of the above-mentioned embodiments, for example, as shown in FIG. 2 and the like, the control unit 140 and the storage unit 141 are provided outside the antenna drive unit 130. However, they may be provided within the antenna drive unit 130, for example, integrally with the LSI.

At least two feature parts of the feature parts of the above-mentioned embodiments can also be combined.

REFERENCE SIGNS LIST

VC1, VC2, VC3 variable capacitor
L3 antenna coil
1 non-contact communication system 2 non-contact feeding system
100, 300, 400 transmission apparatus (non-contact communication apparatus)
110 antenna resonant unit
113 transmission/reception control unit
119 control signal line
129 input line
130 antenna drive unit
131 oscillation unit
132 gain controller
133 DAC
134 ADC
135 output unit
139 control value input unit
140 control unit
141 storage unit
150 feeding apparatus
250 power reception apparatus

The invention claimed is:

1. A non-contact communication apparatus, comprising:
an antenna resonant unit including
an antenna coil, and
a capacitor unit including a variable-capacitance capacitor;
an oscillation unit capable of outputting a signal to the antenna resonant unit;
a measurement unit that measures an output current from the oscillation unit to the antenna resonant unit; and
a control unit that detects a minimum value or maximum value of the measured output current and controls a resonant frequency of the antenna resonant unit by the use of a control value of a control signal for controlling the capacitance of the variable-capacitance capacitor of the capacitor unit, the control value within an arbitrary range including an optimal control value such that the output current becomes minimum or maximum.

2. The non-contact communication apparatus according to claim 1, wherein
the oscillation unit outputs a signal having an oscillation frequency offset from a predetermined frequency.

3. The non-contact communication apparatus according to claim 1, wherein
the control unit performs control by the use of a value of the control value within the arbitrary range, the value being offset from a control value such that the output current becomes minimum or maximum.

4. The non-contact communication apparatus according to claim 1, wherein
the oscillation unit and the measurement unit are provided in an antenna drive unit connected to the antenna resonant unit.

5. The non-contact communication apparatus according to claim 1, further comprising
a storage unit that stores the optimal control value.

6. The non-contact communication apparatus according to claim 1, further comprising
a gain controller that controls a gain of a signal output from the oscillation unit, wherein
the control unit is configured to set the gain that is one of antenna parameters to a first value in a communication period and set the gain to a second value different from the first value in a detection period of the minimum value or maximum value of the output current.

7. The non-contact communication apparatus according to claim 6, wherein
the second value is larger than the first value.

8. The non-contact communication apparatus according to claim 1, wherein
the capacitor unit includes at least one of a series resonant capacitor unit and a parallel resonant capacitor unit.

9. The non-contact communication apparatus according to claim 8, wherein
the capacitor unit includes both of the series resonant capacitor unit and the parallel resonant capacitor unit.

10. The non-contact communication apparatus according to claim 9, wherein
the parallel resonant capacitor unit includes the variable-capacitance capacitor, and
the series resonant capacitor unit includes a fixed-capacitance capacitor.

11. The non-contact communication apparatus according to claim 9, wherein
the parallel resonant capacitor unit includes a fixed-capacitance capacitor, and
the series resonant capacitor unit includes the variable-capacitance capacitor.

12. The non-contact communication apparatus according to claim 9, wherein
the parallel resonant capacitor unit and the series resonant capacitor unit each include the variable-capacitance capacitor.

13. An antenna circuit of a non-contact communication apparatus including an oscillation unit, a measurement unit, and a control unit, comprising:
an antenna coil;
a capacitor unit including a variable-capacitance capacitor;
an input line into which a signal having an oscillation frequency set by the oscillation unit is input; and
a control signal line connected to the variable-capacitance capacitor, wherein
a control value within an arbitrary range including an optimal control value of a control signal for controlling a capacitance of the variable-capacitance capacitor is input into the control signal line, the control signal being output from the control unit, the optimal control value corresponding to a minimum value or maximum value of an output current from the oscillation unit to the antenna circuit, the output current being measured by the measurement unit.

14. An antenna drive apparatus that drives an antenna resonant unit including an antenna coil and a capacitor unit including a variable-capacitance capacitor, comprising:
an oscillation unit capable of outputting a signal to the antenna resonant unit;
a measurement unit that measures an output current from the oscillation unit to the antenna resonant unit; and
a control value input unit into which a control value of a control signal for controlling a capacitance of the variable-capacitance capacitor is input for controlling a resonant frequency of the antenna resonant unit, the control value being within an arbitrary range including an optimal control value such that the measured output current becomes minimum or maximum.

15. A non-contact feeding apparatus, comprising:
an antenna resonant unit including
an antenna coil, and
a capacitor unit including a variable-capacitance capacitor;
an oscillation unit capable of outputting a signal to the antenna resonant unit;
a measurement unit that measures an output current from the oscillation unit to the antenna resonant unit; and a control unit that detects a minimum value or maximum value of the measured output current and controls a resonant frequency of the antenna resonant unit by the use of a control value of a control signal for controlling a capacitance of the variable-capacitance capacitor of the capacitor unit, the control value being within an arbitrary range including an optimal control value such that the output current becomes minimum or maximum.

16. A tuning method for a resonant frequency of an antenna resonant unit including an antenna coil and a capacitor unit including a variable-capacitance capacitor, the method comprising:
    setting, in an oscillation unit, an oscillation frequency of a signal output to the antenna resonant unit;
    measuring an output current from the oscillation unit to the antenna resonant unit;
    detecting a minimum value or maximum value of the measured output current; and
    storing, in a storage unit, a control value of a control signal for controlling the capacitance of the variable-capacitance capacitor of the capacitor unit, the control value being within an arbitrary range including an optimal control value such that the output current becomes minimum or maximum.

17. A program for tuning processing of a non-contact communication apparatus including an antenna resonant unit including an antenna coil and a capacitor unit including a variable-capacitance capacitor, the program causing the non-contact communication apparatus to execute:
    setting, in an oscillation unit, an oscillation frequency of a signal output to the antenna resonant unit;
    measuring an output current from the oscillation unit to the antenna resonant unit;
    detecting a minimum value or maximum value of the measured output current; and
    storing, in a storage unit, a control value of a control signal for controlling a capacitance of the variable-capacitance capacitor of the capacitor unit, the control value being within an arbitrary range including an optimal control value such that the output current becomes minimum or maximum.

* * * * *